United States Patent
Moore et al.

(10) Patent No.: US 7,094,863 B2
(45) Date of Patent: Aug. 22, 2006

(54) POLYESTER PREFORMS USEFUL FOR ENHANCED HEAT-SET BOTTLES

(75) Inventors: Tony Clifford Moore, Charlotte, NC (US); David Eugene Thompson, Florence, SC (US); Sharon Sue Griffith, Charlotte, NC (US); Carl S. Nichols, Waxhaw, NC (US); Billy Mack Humelsine, Waxhaw, NC (US); Robert Joseph Schiavone, Matthews, NC (US)

(73) Assignee: Wellman, Inc., Fort Hill, SC (US)

( * ) Notice: Subject to any disclaimer, the term of this patent is extended or adjusted under 35 U.S.C. 154(b) by 0 days.

(21) Appl. No.: 10/996,789

(22) Filed: Nov. 24, 2004

(65) Prior Publication Data

US 2005/0153086 A1 Jul. 14, 2005

Related U.S. Application Data

(63) Continuation-in-part of application No. 10/850,918, filed on May 21, 2004.

(60) Provisional application No. 60/573,024, filed on May 20, 2004, provisional application No. 60/559,983, filed on Apr. 6, 2004, provisional application No. 60/472,309, filed on May 21, 2003.

(51) Int. Cl.
    C08G 63/00 (2006.01)
(52) U.S. Cl. .................. 528/272; 264/176.6; 264/219; 524/424; 528/271
(58) Field of Classification Search ............ 264/176.6, 264/219; 524/424; 528/271, 272
See application file for complete search history.

(56) References Cited

U.S. PATENT DOCUMENTS

| | | |
|---|---|---|
| 3,907,754 A | 9/1975 | Tershansy et al. |
| 3,962,189 A | 6/1976 | Russin et al. |
| 4,010,145 A | 3/1977 | Russin et al. |
| 4,205,157 A | 5/1980 | Duh |
| 4,208,527 A | 6/1980 | Horlbeck et al. |
| 4,250,078 A | 2/1981 | McFarlane et al. |
| 4,356,299 A | 10/1982 | Cholod et al. |
| 4,375,442 A | 3/1983 | Ota et al. |
| 4,408,004 A | 10/1983 | Pengilly |
| 4,499,262 A | 2/1985 | Fagerburg et al. |
| 4,820,795 A | 4/1989 | Hirata et al. |
| 5,008,230 A | 4/1991 | Nichols |
| 5,017,680 A | 5/1991 | Sublett |
| 5,106,944 A | 4/1992 | Sublett |
| 5,138,024 A | 8/1992 | Brozek et al. |
| 5,241,046 A | 8/1993 | Shiraki et al. |
| 5,340,910 A | 8/1994 | Chamberlin et al. |
| 5,376,702 A | 12/1994 | Stibal et al. |
| 5,397,819 A | 3/1995 | Krutak et al. |
| 5,407,752 A | 4/1995 | Fukuzumi et al. |
| 5,409,983 A | 4/1995 | Jones et al. |
| 5,656,716 A | 8/1997 | Schmidt et al. |
| 5,684,116 A | 11/1997 | Martl et al. |
| 5,703,229 A | 12/1997 | Krutak et al. |
| 5,744,571 A | 4/1998 | Hilbert et al. |
| 5,789,528 A | 8/1998 | Martl et al. |
| 5,852,164 A | 12/1998 | Akai et al. |
| 5,874,515 A | 2/1999 | Huang et al. |
| 5,874,517 A | 2/1999 | Huang et al. |
| 5,898,058 A | 4/1999 | Nichols et al. |
| 5,922,828 A | 7/1999 | Schiraldi |
| 5,981,690 A | 11/1999 | Lustig et al. |
| 6,013,756 A | 1/2000 | Hagen et al. |
| 6,022,922 A | 2/2000 | Bergh et al. |
| 6,063,465 A | 5/2000 | Charbonneau et al. |
| 6,160,085 A | 12/2000 | Fujimori et al. |
| 6,277,455 B1 | 8/2001 | Shimizu et al. |
| 6,291,066 B1 | 9/2001 | Branum |
| 6,303,739 B1 | 10/2001 | Branum |
| 6,309,718 B1 | 10/2001 | Sprayberry |
| 6,322,886 B1 | 11/2001 | Branum |
| 6,346,070 B1 | 2/2002 | Ohmatsuzawa et al. |
| 6,399,705 B1 | 6/2002 | Branum |
| 6,437,088 B1 | 8/2002 | Duan |
| 6,451,959 B1 | 9/2002 | Ohmatsuzawa et al. |
| 6,454,982 B1 | 9/2002 | Branum |
| 6,500,890 B1 | 12/2002 | Edwards et al. |
| 6,500,915 B1 | 12/2002 | Fujimori et al. |
| 6,503,586 B1 | 1/2003 | Wu et al. |
| 6,509,091 B1 | 1/2003 | Branum et al. |
| 6,559,271 B1 | 5/2003 | Schaaf et al. |

(Continued)

FOREIGN PATENT DOCUMENTS

EP 0699700 A2 3/1996

(Continued)

OTHER PUBLICATIONS

International Preliminary Report on Patentability dated Aug. 19, 2005 and Written Opinion dated May 4, 2005 in international application No. PCT/US2004/016375 filed May 21, 2004.

(Continued)

Primary Examiner—Terressa Boykin
(74) Attorney, Agent, or Firm—Summa, Allan & Addition, P.A.

(57) ABSTRACT

The present invention relates to slow-crystallizing polyethylene terephthalate resins that possess a significantly higher heating crystallization exotherm peak temperature ($T_{CH}$) as compared with those of conventional antimony-catalyzed polyethylene terephthalate resins. The polyethylene terephthalate preforms of the present invention, which possess improved reheating profiles, are especially useful for making polyester bottles that have exceptional clarity and that retain acceptable dimensional stability upon being hot-filled with product at temperatures between about 195° F. and 205° F.

68 Claims, 13 Drawing Sheets

U.S. PATENT DOCUMENTS

| | | |
|---|---|---|
| 6,569,991 B1 | 5/2003 | Nichols et al. |
| 6,573,359 B1 | 6/2003 | Nichols et al. |
| 6,582,817 B1 | 6/2003 | Carnes et al. |
| 6,590,069 B1 | 7/2003 | Nichols et al. |
| 6,599,596 B1 | 7/2003 | Nichols et al. |
| 6,623,853 B1 | 9/2003 | Branum et al. |
| 6,667,383 B1 | 12/2003 | Fujimori et al. |
| 6,699,546 B1 | 3/2004 | Tseng |
| 6,727,306 B1 | 4/2004 | Edwards et al. |
| 6,787,630 B1 | 9/2004 | Dominguez et al. |
| 6,803,082 B1 | 10/2004 | Nichols et al. |
| 2002/0011694 A1 | 1/2002 | Nichols et al. |
| 2002/0027314 A1 | 3/2002 | Nichols et al. |
| 2002/0033560 A1 | 3/2002 | Nichols et al. |
| 2002/0077445 A1 | 6/2002 | Nichols et al. |
| 2003/0144459 A1 | 7/2003 | Fujimori et al. |
| 2004/0026827 A1 | 2/2004 | Dairanieh et al. |
| 2004/0030029 A1 | 2/2004 | Weinhold et al. |
| 2004/0101642 A1* | 5/2004 | Quillen et al. ............. 428/35.7 |
| 2004/0219319 A1 | 11/2004 | Brooks et al. |
| 2004/0236066 A1 | 11/2004 | Moore et al. |
| 2005/0153086 A1 | 7/2005 | Moore et al. |
| 2005/0196566 A1 | 9/2005 | Colhoun et al. |
| 2005/0261462 A1 | 11/2005 | Moore |

FOREIGN PATENT DOCUMENTS

| | | |
|---|---|---|
| EP | 0746581 | 6/1996 |
| EP | 1043 362 A | 11/2000 |
| JP | 62207325 A | 9/1987 |
| JP | 07 292087 | 11/1995 |
| JP | 8073581 | 3/1996 |
| JP | 08188704 A | 7/1996 |
| JP | 09-071639 | 3/1997 |
| JP | 09087374 A | 3/1997 |
| JP | 09-194697 | 7/1997 |
| JP | 2000 128964 | 5/2000 |
| JP | 2000143789 A | 5/2000 |
| JP | 2000 219726 | 8/2000 |
| JP | 2000 219730 | 8/2000 |
| JP | 2000 226444 | 8/2000 |
| JP | 2000 226445 | 8/2000 |
| JP | 2000 226446 | 8/2000 |
| JP | 2000 226500 | 8/2000 |
| JP | 2001 002792 | 1/2001 |
| JP | 2002 003708 | 1/2002 |
| WO | WO 00/64961 A1 | 11/2000 |
| WO | WO 01/21680 A | 3/2001 |
| WO | WO 2002/009328 A | 1/2004 |
| WO | WO 2004/009328 A | 1/2004 |
| WO | WO 2004/104080 | 12/2004 |
| WO | WO 2005/103110 | 11/2005 |

OTHER PUBLICATIONS

International Search Report and Written Opinion dated Dec. 7, 2005 in international application No. PCT/US04/39726.

Product Data Sheet—Voridian PET 9921, retrieved on Feb. 1, 2006 at www.eastman.com.

Product Data Sheet—Heatwave Polymer CF746, retrieved on Feb. 1, 2006 at www.eastman.com.

Product Data Sheet—Voridian PET CB12, retrieved on Feb. 1, 2006 at www.eastman.com.

Product Data Sheet—Voridian PET 9921W, retrieved on Feb. 1, 2006 at www.eastman.com.

Hal Good; Pet Bottle Manufacturing and Color Measurement; Hunter Lab, Reston, VA.

Measuring Plastic Pellets Using the LabScan XE; www.hunterlab.com/measurementmethods/pellets.html.

Measuring Transparent Liquids; www.hunterlab.com/measurementmethods/trans.html.

Measuring Transparent Bottle Preforms; www.hunterlab.com/measurementmethods/preform2.html.

Measuring Opaque or Dense Bottle Preforms; www.hunterlab.com/measurementmethods/preforms.html.

Preliminary product specification—Wellman ThermaClearTi Ti818; Nov. 1, 2003.

International Search Report for International Patent Application No. PCT/US2004/016375 dated Sep. 17, 2004.

* cited by examiner

Plaque Haze v Thickness

FIGURE 10 (Impact of Reactive Carrier Molecular Weight upon Intrinsic Viscosity)

FIGURE 11 (Impact of Reactive Carrier Molecular Weight upon Intrinsic Viscosity)

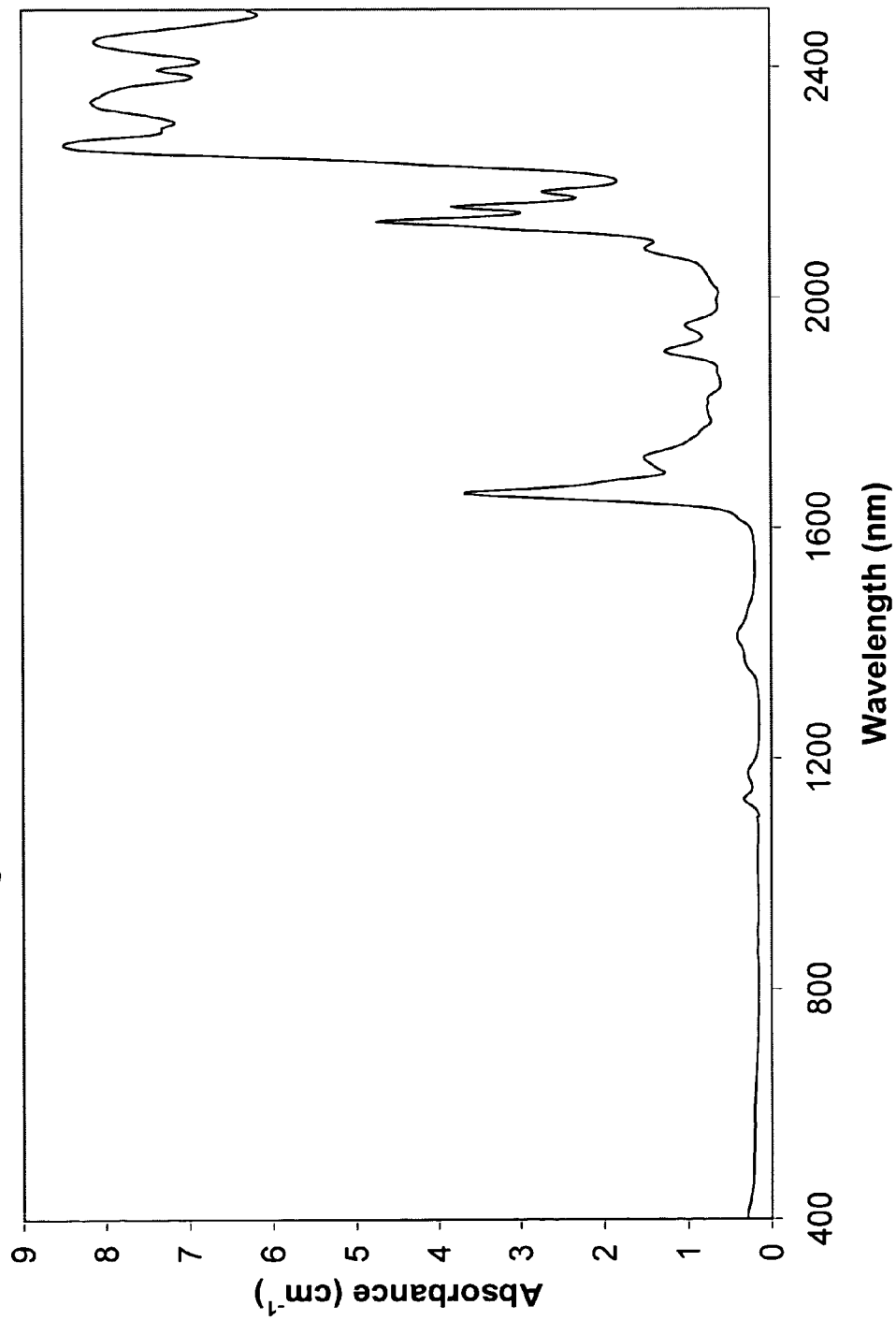
Figure 12 (Absorbance vs. Wavelength)

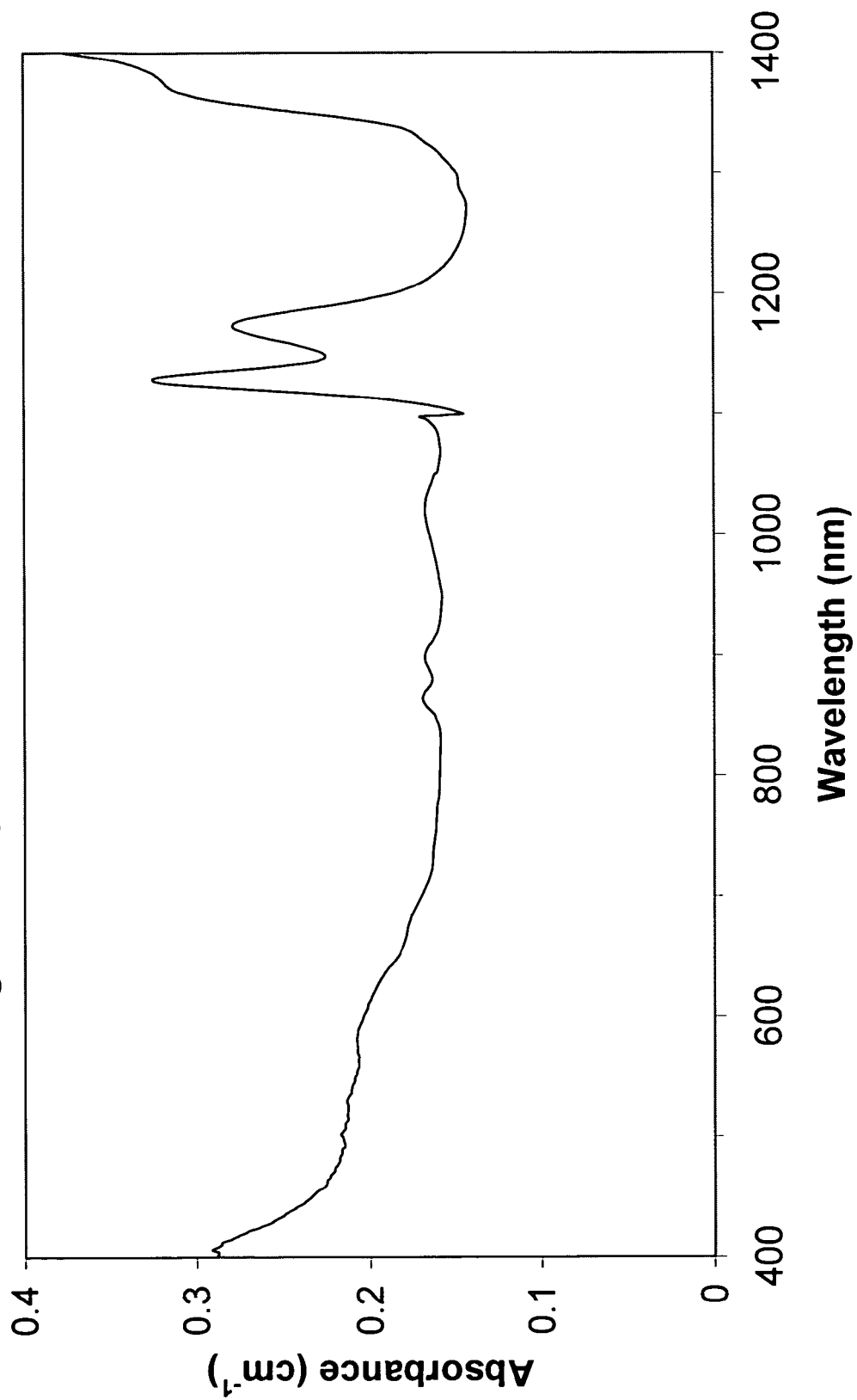
Figure 13 (Absorbance vs. Wavelength)

US 7,094,863 B2

POLYESTER PREFORMS USEFUL FOR ENHANCED HEAT-SET BOTTLES

CROSS-REFERENCE TO COMMONLY ASSIGNED APPLICATIONS

This application is a continuation-in-part of commonly assigned U.S. patent application Ser. No. 10/850,918, for Slow-Crystallizing Polyester Resins, filed May 21, 2004, which is hereby incorporated by reference in its entirety. U.S. patent application Ser. No. 10/850,918 claims its earliest priority to U.S. Provisional Patent Application Ser. No. 60/472,309, for Titanium-Catalyzed Polyester Resins, Preforms, and Bottles, filed May 21, 2003, which is likewise incorporated by reference in its entirety.

This application further claims the benefit of the following commonly assigned provisional patent applications: U.S. Provisional Patent Application Ser. No. 60/559,983, for Titanium-Catalyzed Polyester Resins, Preforms, and Bottles, filed Apr. 6, 2004; and U.S. Provisional Patent Application Ser. No. 60/573,024, for Slow-Crystallizing Polyester Resins and Polyester Preforms Having Improved Reheating Profile, filed May 20, 2004. This application incorporates entirely by reference these provisional applications.

This application further incorporates entirely by reference the following commonly assigned patents and patent applications: Ser. No. 09/738,150, for Methods of Post-Polymerization Injection in Continuous Polyethylene Terephthalate Production, filed Dec. 15, 2000, now U.S. Pat. No. 6,599,596; Ser. No. 09/932,150, for Methods of Post-Polymerization Extruder Injection in Polyethylene Terephthalate Production, filed Aug. 17, 2001, now U.S. Pat. No. 6,569,991; Ser. No. 10/017,612, for Methods of Post-Polymerization Injection in Condensation Polymer Production, filed Dec. 14, 2001, now U.S. Pat. No. 6,573,359; Ser. No. 10/017,400, for Methods of Post-Polymerization Extruder Injection in Condensation Polymer Production, filed Dec. 14, 2001, now U.S. Pat. No. 6,590,069; Ser. No. 10/628,077, for Methods for the Late Introduction of Additives into Polyethylene Terephthalate, filed Jul. 25, 2003; Ser. No. 09/738,619, for Polyester Bottle Resins Having Reduced Frictional Properties and Methods for Making the Same, filed Dec. 15, 2000, now U.S. Pat. No. 6,500,890; Ser. No. 10/176,737 for Polymer Resins Having Reduced Frictional Properties, filed Jun. 21, 2002, now U.S. Pat. No. 6,727,306; and U.S. patent application Ser. No. 10/850,269, for Methods of Making Titanium-Catalyzed Polyester Resins, filed May 20, 2004.

BACKGROUND OF THE INVENTION

Because of their strength, heat resistance, and chemical resistance, polyester containers, films, and fibers are an integral component in numerous consumer products manufactured worldwide. In this regard, most commercial polyester used for polyester containers, films, and fibers is polyethylene terephthalate polyester.

Polyester resins, especially polyethylene terephthalate and its copolyesters, are also widely used to produce rigid packaging, such as two-liter soft drink containers. Polyester packages produced by stretch-blow molding possess outstanding strength and shatter resistance, and have excellent gas barrier and organoleptic properties as well. Consequently, such lightweight plastics have virtually replaced glass in packaging numerous consumer products (e.g., carbonated soft drinks, fruit juices, and peanut butter).

In conventional processes for making bottle resins, modified polyethylene terephthalate resin is polymerized in the melt phase to an intrinsic viscosity of about 0.6 deciliters per gram (dl/g), whereupon it is further polymerized in the solid phase to achieve an intrinsic viscosity that better promotes bottle formation. Thereafter, the polyethylene terephthalate may be injection molded into preforms, which in turn may be blow molded into bottles.

Unfortunately, at normal production rates, most polyester resins cannot be efficiently formed into preforms and bottles that are suitable for hot-fill applications. Most high-clarity polyester bottles do not possess the necessary dimensional stability to be hot-filled with product at temperatures between about 180° F. and 205° F., especially between about 195° F. and 205° F. In particular, at such elevated temperature conventional polyester bottles exhibit unacceptable shrinkage and haze.

Therefore, there is a need for polyethylene terephthalate resin that is suitable for making high-clarity, hot-fill bottles that can be filled with product at temperatures between about 180° F. and 205° F.

SUMMARY OF THE INVENTION

Accordingly, it is an object of the present invention to provide high-clarity polyester bottles that retain acceptable dimensional stability upon being filled with product at temperatures between about 195° F. and 205° F.

It is a further object of the present invention to provide high-clarity preforms that have improved reheating profiles and that can be efficiently formed into hot-fill polyester bottles.

It is a further object of the present invention to provide a polyethylene terephthalate resin that can be efficiently formed into high-clarity, hot-fill polyester preforms and bottles.

It is a further object of the present invention to provide a polyethylene terephthalate resin that can be efficiently formed into high-clarity polyester bottles suitable for carbonated soft drinks.

It is a further object of the present invention to provide methods for efficiently forming titanium-catalyzed polyethylene terephthalate resins, preforms, and bottles.

It is a further object of the present invention to provide a polyethylene terephthalate resin that can be used to make fibers, yarns, and fabrics.

The foregoing, as well as other objectives and advantages of the invention and the manner in which the same are accomplished, is further specified within the following detailed description and its accompanying drawings.

BRIEF DESCRIPTION OF THE DRAWINGS

FIGS. 12–13 illustrates the absorbance ($cm^{-1}$) of a representative polyethylene terephthalate unenhanced by heat-up rate additives.

DETAILED DESCRIPTION

Figure 1:
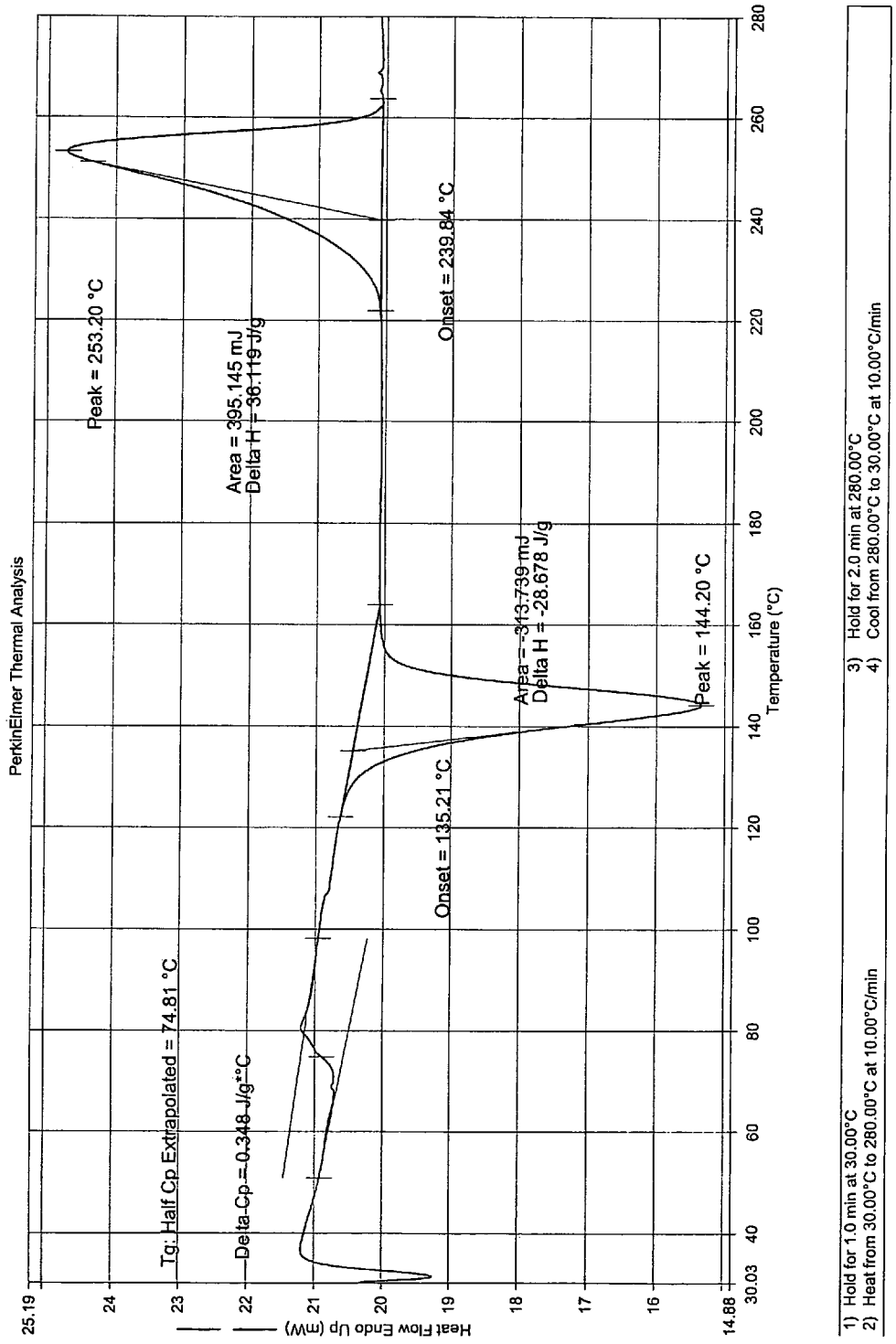
FIGS. 1–2 illustrate differential scanning calorimetry thermal analyses performed on a titanium-catalyzed polyethylene terephthalate resin having an intrinsic viscosity of 0.78 dl/g and being modified with 1.6 mole percent diethylene glycol and 1.5 mole percent isophthalic acid.

The invention is a slow-crystallizing polyethylene terephthalate resin. As herein disclosed, the polyethylene terephthalate resins of the present invention possess a significantly higher heating crystallization exotherm peak temperature ($T_{CH}$) as compared with those of conventional antimony-catalyzed polyethylene terephthalate resins. This elevated heating crystallization exotherm temperature delays the onset of crystallization. Accordingly, the polyethylene terephthalate resins of the present invention are especially useful for making hot-fill bottles having exceptional clarity and shrinkage properties.

In one aspect, the invention is a polyethylene terephthalate resin possessing a heating crystallization exotherm peak temperature ($T_{CH}$) of more than about 140° C., an absorbance (A) of at least about 0.18 $cm^{-1}$ at an wavelength of 1100 nm or 1280 nm, and an L* value of more than about 70 as classified in the CIE L*a*b* color space.

In another aspect, the invention is a polyethylene terephthalate resin that includes at least 2 parts per million (ppm)—and preferably less than 50 ppm—of elemental titanium and less than about 6 mole percent comonomer substitution. This titanium-catalyzed polyethylene terephthalate resin is especially useful in containers, films, and packaging, but may be used for fibers, yarns, and fabrics as well.

In yet another aspect, the invention is a polyethylene terephthalate preform that is useful for enhanced heat-set bottles. The polyethylene terephthalate preform possesses a heating crystallization exotherm peak temperature ($T_{CH}$) of more than about 140° C., an absorbance (A) of at least about 0.18 $cm^{-1}$ at an wavelength of 1100 nm or 1280 nm, and an L* value of more than about 70 as classified in the CIE L*a*b* color space.

In yet another aspect, the invention is a polyester preform that can be formed into a high-clarity bottle that has excellent, low shrinkage properties. The preform includes less than about six (6) mole percent comonomer substitution and has an intrinsic viscosity of less than about 0.86 dl/g. In a related aspect, the invention is a high-clarity, hot-fill bottle formed from the preform.

In yet another aspect, the invention is a polyester preform that can be formed into a high-clarity bottle having excellent thermal expansion properties. The preform includes less than about 6 mole percent comonomer substitution and has an intrinsic viscosity of between about 0.78 and 0.86 dl/g. In a related aspect, the invention is a high-clarity, carbonated soft drink bottle formed from the preform. The carbonated soft drink bottle is capable of withstanding internal pressures of about 60 psig.

In yet another aspect, the invention is a titanium-based catalyst system that facilitates the melt phase polymerization of polyethylene terephthalate resins.

In yet another aspect, the invention is a catalyst system of Group I and Group II metals that facilitates the solid state polymerization (SSP) of polyethylene terephthalate resins. The SSP catalyst system preferably includes alkali earth metals (i.e., Group I metals), alkaline earth metals (i.e., Group II metals), or both.

In yet another aspect, the invention embraces methods for making such polyester resins, preforms, and bottles. In this regard, the method generally includes reacting a terephthalate component and a diol component (i.e., a terephthalate moiety and a diol moiety) in the presence of a titanium catalyst to form polyethylene terephthalate precursors, which are then polymerized via melt phase polycondensation to form polymers of polyethylene terephthalate of a desired molecular weight. During polycondensation, which is usually enhanced by catalysts, ethylene glycol is continuously removed to create favorable reaction kinetics.

Those having ordinary skill in the art will appreciate that most commercial polyethylene terephthalate polymers are, in fact, modified polyethylene terephthalate polyesters. Indeed, the polyethylene terephthalate resins described herein are preferably modified polyethylene terephthalate polyesters. In this regard, the modifiers in the terephthalate component and the diol component are typically randomly substituted in the resulting polyester composition.

As noted, the titanium-catalyzed polyethylene terephthalate resin possesses low comonomer substitution. The polyethylene terephthalate generally includes less than about 6 mole percent comonomer substitution. The polyethylene terephthalate typically includes less than 5 mole percent comonomer substitution or more than 2 mole percent comonomer substitution, or both.

Although higher comonomer substitution disrupts crystallization, thereby improving clarity, heat-setting is enhanced at lower comonomer substitution. Thus, for resins used in making hot-fill bottles, the polyethylene terephthalate preferably includes between about 3 and 4 mole percent comonomer substitution. For example, in one such embodiment the modified polyethylene terephthalate is composed of about a 1:1 molar ratio of (1) a diacid component of 2.4 mole percent isophthalic acid with the remainder terephthalic acid, and (2) a diol component of 1.6 mole percent diethylene glycol and the remainder ethylene glycol.

As used herein, the term "diol component" refers primarily to ethylene glycol, although other diols (e.g., diethylene glycol) may be used as well.

The term "terephthalate component" broadly refers to diacids and diesters that can be used to prepare polyethylene terephthalate. In particular, the terephthalate component mostly includes either terephthalic acid or dimethyl terephthalate, but can include diacid and diester comonomers as well. In other words, the "terephthalate component" is either a "diacid component" or a "diester component."

The term "diacid component" refers somewhat more specifically to diacids (e.g., terephthalic acid) that can be used to prepare polyethylene terephthalate via direct esterification. The term "diacid component," however, is intended to embrace relatively minor amounts of diester comonomer (e.g., mostly terephthalic acid and one or more diacid modifiers, but optionally with some diester modifiers, too).

Similarly, the term "diester component" refers somewhat more specifically to diesters (e.g., dimethyl terephthalate) that can be used to prepare polyethylene terephthalate via ester exchange. The term "diester component," however, is intended to embrace relatively minor amounts of diacid comonomer (e.g., mostly dimethyl terephthalate and one or more diester modifiers, but optionally with some diacid modifiers, too).

Moreover, as used herein, the term "comonomer" is intended to include monomeric and oligomeric modifiers (e.g., polyethylene glycol).

The diol component can include other diols besides ethylene glycol (e.g., diethylene glycol, polyethylene glycol, 1,3-propanediol, 1,4-butanediol, 1,4-cyclohexane dimethanol, neopentyl glycol, and isosorbide), or the terephthalate component, in addition to terephthalic acid or its dialkyl ester (i.e., dimethyl terephthalate), can include modifiers such as isophthalic acid or its dialkyl ester (i.e., dimethyl isophthalate), 2,6-naphthalene dicarboxylic acid or its dialkyl ester (i.e., dimethyl 2,6 naphthalene dicarboxylate), adipic acid or its dialkyl ester (i.e., dimethyl adipate), succinic acid, its dialkyl ester (i.e., dimethyl succinate), or its anhydride (i.e., succinic anhydride), or one or more functional derivatives of terephthalic acid.

For polyethylene terephthalate bottle resins according to the present invention, isophthalic acid and diethylene glycol are the preferred modifiers. Those having ordinary skill in the art will appreciate that as a modifier, cyclohexane dimethanol efficiently suppresses polymer crystallinity, but has poor oxygen permeability properties.

For polyethylene terephthalate fiber resins according to the present invention, no comonomer substitution is necessary, but where employed, preferably includes diethylene glycol or polyethylene glycol.

It will be understood that diacid comonomer should be employed when the terephthalate component is mostly terephthalic acid (i.e., a diacid component), and diester comonomer should be employed when the terephthalate component is mostly dimethyl terephthalate (i.e., a diester component).

It will be further understood by those having ordinary skill in the art that to achieve the polyester composition of the present invention a molar excess of the diol component is reacted with the terephthalate component (i.e., the diol component is present in excess of stoichiometric proportions).

In reacting a diacid component and a diol component via a direct esterification reaction, the molar ratio of the diacid component and the diol component is typically between about 1.0:1.0 and 1.0:1.6. Alternatively, in reacting a diester component and a diol component via an ester interchange reaction, the molar ratio of the diester component and the diol component is typically greater than about 1.0:2.0.

The diol component usually forms the majority of terminal ends of the polymer chains and so is present in the resulting polyester composition in slightly greater fractions. This is what is meant by the phrases "about a 1:1 molar ratio of a terephthalate component and a diol component," "about a 1:1 molar ratio of a diacid component and a diol component," and "about a 1:1 molar ratio of the diester component and the diol component," each of which may be used to describe the polyester compositions of the present invention.

The titanium-catalyzed polyethylene terephthalate resin is preferably composed of about a 1:1 molar ratio of a diacid component and a diol component. The diacid component includes at least 94 mole percent terephthalic acid (e.g., terephthalic acid and isophthalic acid) and the diol component includes at least 94 mole percent ethylene glycol (e.g., ethylene glycol and diethylene glycol).

The titanium-catalyzed polyethylene terephthalate resin according to the present invention generally possesses an intrinsic viscosity of less than about 0.86 dl/g. Those having ordinary skill in the art will appreciate, however, that during injection molding operations polyester resins tend to lose intrinsic viscosity (e.g., an intrinsic viscosity loss of about 0.02–0.06 dl/g from chip to preform).

For polyester preforms that are capable of forming high-clarity, hot-fill bottles according to the present invention, the polyethylene terephthalate generally has an intrinsic viscosity of less than about 0.86 dl/g, such as between about 0.72 dl/g and 0.84 dl/g). More typically, the polyethylene terephthalate has an intrinsic viscosity of more than about 0.68 dl/g or less than about 0.80 dl/g, or both (i.e., between about 0.68 dl/g and 0.80 dl/g). The polyethylene terephthalate preferably has an intrinsic viscosity of more than about 0.72 dl/g or less than about 0.78 dl/g, or both (i.e., between about 0.72 dl/g and 0.78 dl/g). Most preferably, the polyethylene terephthalate has an intrinsic viscosity of more than about 0.75 dl/g as well (i.e., between about 0.75 dl/g and 0.78 dl/g). For preforms used to make hot-fill bottles, heat-setting performance diminishes at higher intrinsic viscosity levels and mechanical properties (e.g., stress cracking, drop impact, and creep) decrease at lower intrinsic viscosity levels (e.g., less than 0.6 dl/g).

For polyester preforms that are capable of forming high-clarity, carbonated soft drink bottles according to the present invention, the polyethylene terephthalate typically has an intrinsic viscosity of more than about 0.72 dl/g or less than about 0.84 dl/g, or both (i.e., between about 0.72 dl/g and 0.84 dl/g). The polyethylene terephthalate preferably has an intrinsic viscosity of more than about 0.78 dl/g, and most preferably, an intrinsic viscosity of between about 0.80 dl/g and 0.84 dl/g.

For polyester fibers according to the present invention, the polyethylene terephthalate typically has an intrinsic viscosity of between about 0.50 dl/g and 0.70 dl/g and preferably an intrinsic viscosity between about 0.60 dl/g and 0.65 dl/g (e.g., 0.62 dl/g). The polyethylene terephthalate fiber resins are typically polymerized only in the melt phase (i.e., the fiber resins usually do not undergo solid state polymerization).

As used herein, the term "intrinsic viscosity" is the ratio of the specific viscosity of a polymer solution of known concentration to the concentration of solute, extrapolated to zero concentration. Intrinsic viscosity, which is widely recognized as standard measurements of polymer characteristics, is directly proportional to average polymer molecular weight. See, e.g., *Dictionary of Fiber and Textile Technology*, Hoechst Celanese Corporation (1990); Tortora & Merkel, *Fairchild's Dictionary of Textiles* ($7^{th}$ Edition 1996).

Intrinsic viscosity can be measured and determined without undue experimentation by those of ordinary skill in this art. For the intrinsic viscosity values described herein, the intrinsic viscosity is determined by dissolving the copolyester in orthochlorophenol (OCP), measuring the relative viscosity of the solution using a Schott Autoviscometer (AVS Schott and AVS 500 Viscosystem), and then calculating the intrinsic viscosity based on the relative viscosity. See, e.g., *Dictionary of Fiber and Textile Technology* ("intrinsic viscosity").

In particular, a 0.6-gram sample (+/−0.005 g) of dried polymer sample is dissolved in about 50 ml (61.0–63.5 grams) of orthochlorophenol at a temperature of about 105° C. Fiber and yarn samples are typically cut into small pieces, whereas chip samples are ground. After cooling to room temperature, the solution is placed in the viscometer at a controlled, constant temperature, (e.g., between about 20° and 25° C.), and the relative viscosity is measured. As noted, intrinsic viscosity is calculated from relative viscosity.

As noted, the titanium-catalyzed polyethylene terephthalate resin typically includes between about 2 ppm and 50 ppm of elemental titanium. Preferably, the resin includes less than 25 ppm of elemental titanium (e.g., between about 2 and 20 ppm). More preferably, the resin includes at least about 5 ppm of elemental titanium or less than about 15 ppm of elemental titanium, or both (i.e., between about 5 and 15 ppm, such as about 10 ppm). The titanium catalyst is typically a titanate, such as titanium diisopropoxide bis (acetyl-acetonate) or tetrabutyl titanate.

Those having ordinary skill in the art will appreciate that germanium is an excellent polyethylene terephthalate catalyst. Germanium, however, is prohibitively expensive and so is disfavored in the production of commercial polyesters.

Accordingly, the present resin reduces costs by including less than about 20 ppm of elemental germanium, typically less than about 15 ppm of elemental germanium, and more typically less than about 10 ppm of elemental germanium. Preferably, the titanium-catalyzed polyethylene terephthalate resins include less than 5 ppm of elemental germanium and more preferably less than about 2 ppm of elemental germanium. In many instances, the titanium-catalyzed polyethylene terephthalate resins are essentially free of elemental germanium. In other instances, however, the titanium-catalyzed polyethylene terephthalate resins include at least about two ppm of elemental germanium.

Those having ordinary skill in the art will further appreciate that titanium-catalyzed polyester resins possess lower rates of crystallization as compared with conventional antimony-catalyzed polyester resins. The titanium-catalyzed polyethylene terephthalate resins of the present invention thus possess lower crystallinity than otherwise identical antimony-catalyzed polyethylene terephthalate resins. Without being bound to a particular theory, it is believed that titanium is a poor nucleator as compared with antimony. Consequently, the titanium-catalyzed polyethylene terephthalate resins of the present invention possess lower crystallization rates as compared with antimony-catalyzed polyesters. As will be understood by those having ordinary skill in art, this permits preforms according to the present invention to be blow molded into high-clarity bottles.

Accordingly, the present resin includes less than about 100 ppm of elemental antimony, typically less than about 75 ppm of elemental antimony, and more typically less than about 50 ppm of elemental antimony. Preferably, the titanium-catalyzed polyethylene terephthalate resins include less than 25 ppm of elemental antimony and more preferably less than about 10 ppm of elemental antimony. In many instances, the titanium-catalyzed polyethylene terephthalate resins are essentially free of elemental antimony. Antimony-free polyethylene terephthalate resins may be desirable as antimony is considered a heavy metal. In other instances, however, the titanium-catalyzed polyethylene terephthalate resins include at least about 10 ppm of elemental antimony.

FIGS. 1–8 depict differential scanning calorimetry (DSC) thermal analyses performed on both titanium-catalyzed and antimony-catalyzed polyester resins at an intrinsic viscosity of about 0.78 dl/g. FIGS. 1–4 compare titanium-catalyzed and antimony-catalyzed polyethylene terephthalate resins having about 3 mole percent comonomer substitution. FIGS. 5–8 compare the titanium-catalyzed and antimony-catalyzed polyethylene terephthalate resins including about 4 mole percent comonomer substitution.

The differential scanning calorimetry was performed by (1) holding a modified polyethylene terephthalate sample for one minute at 30 degrees Celsius; (2) heating the sample from 30 degrees Celsius to 280 degrees Celsius at 10 degrees Celsius per minute; (3) holding the sample at 280 degrees Celsius for two minutes; and (4) cooling the sample from 280 degrees to 30 degrees Celsius at 10 degrees Celsius per minute. FIGS. 1, 3, 5, and 7 correspond to the heating of amorphous polymer and FIGS. 2, 4, 6, and 8 correspond to the cooling of the same polymer from the melt phase.

Figure 2:
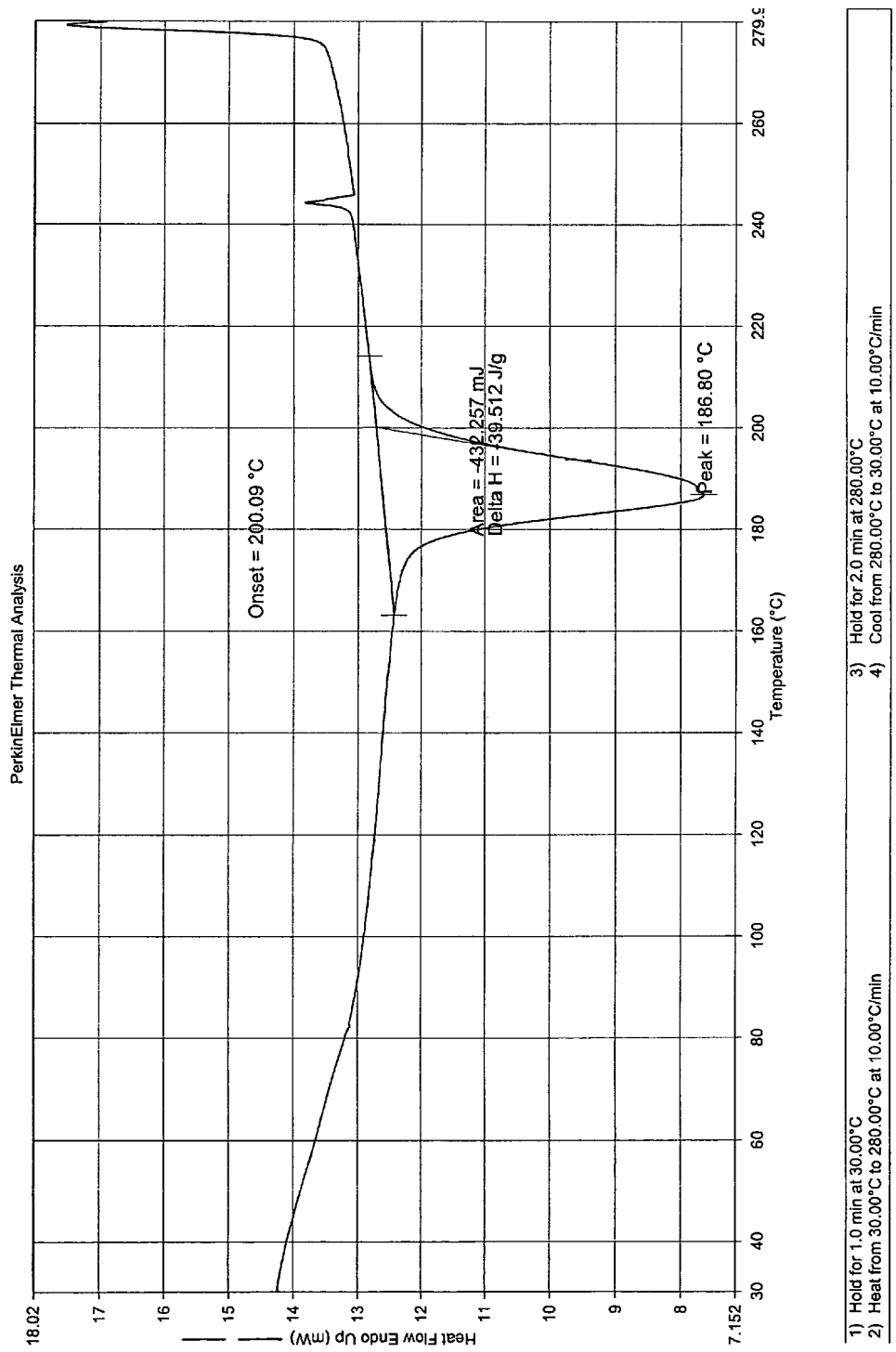

FIGS. 1–2 show that at the comonomer substitution of about 3 percent (i.e., 1.6 mole percent diethylene glycol and 1.5 mole percent isophthalic acid substitution), the titanium-catalyzed polyethylene terephthalate polyester possesses a heating crystallization exotherm peak temperature ($T_{CH}$) of 144.2° C., crystalline melting peak temperature ($T_M$) of 253.2° C., and a cooling crystallization exotherm peak temperature ($T_{CC}$) of 186.8° C.

Figure 3:
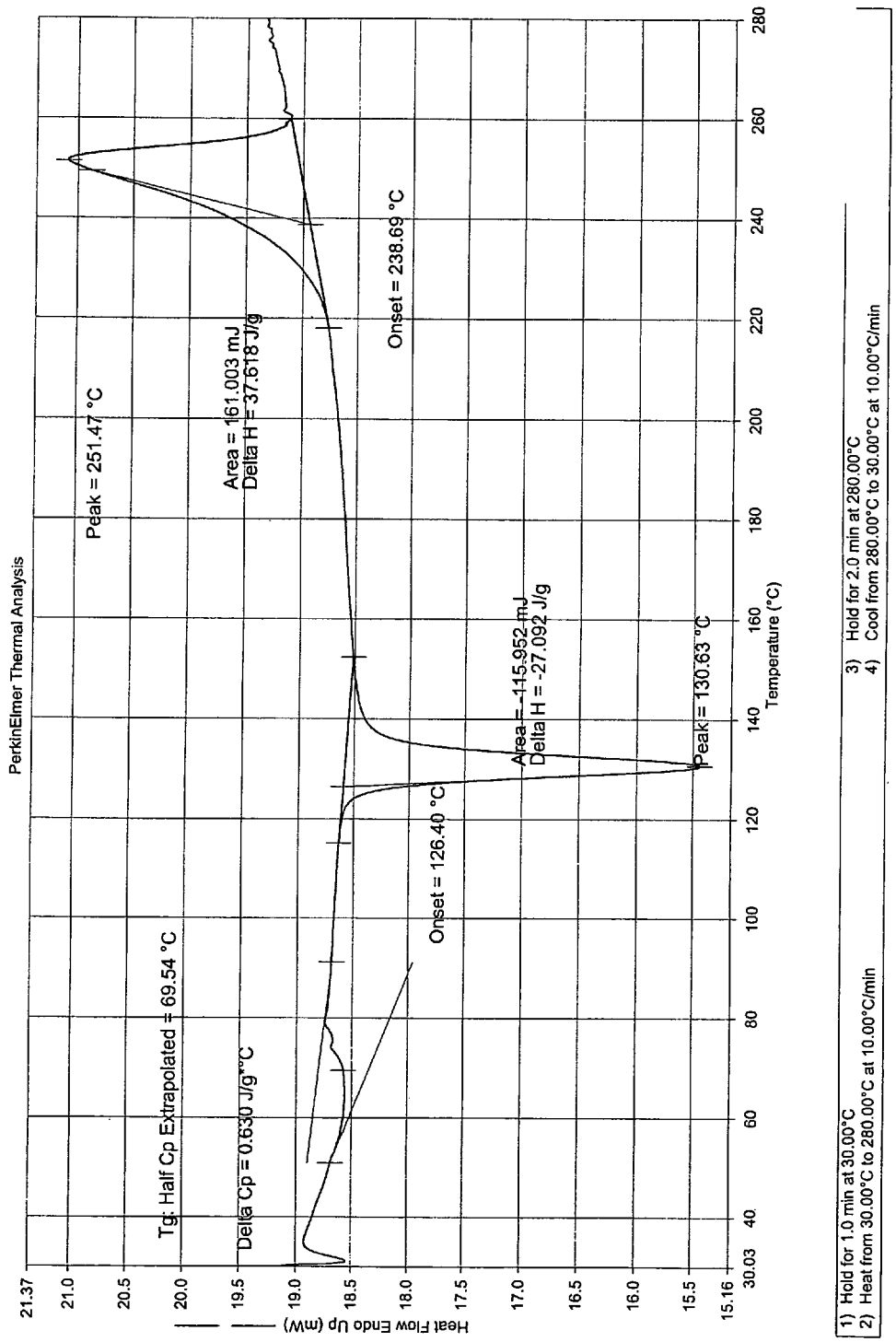
FIGS. 3–4 illustrate differential scanning calorimetry thermal analyses performed on an antimony-catalyzed polyethylene terephthalate resin having an intrinsic viscosity of 0.78 dl/g and being modified with 1.6 mole percent diethylene glycol and 1.5 mole percent isophthalic acid.
Figure 4:
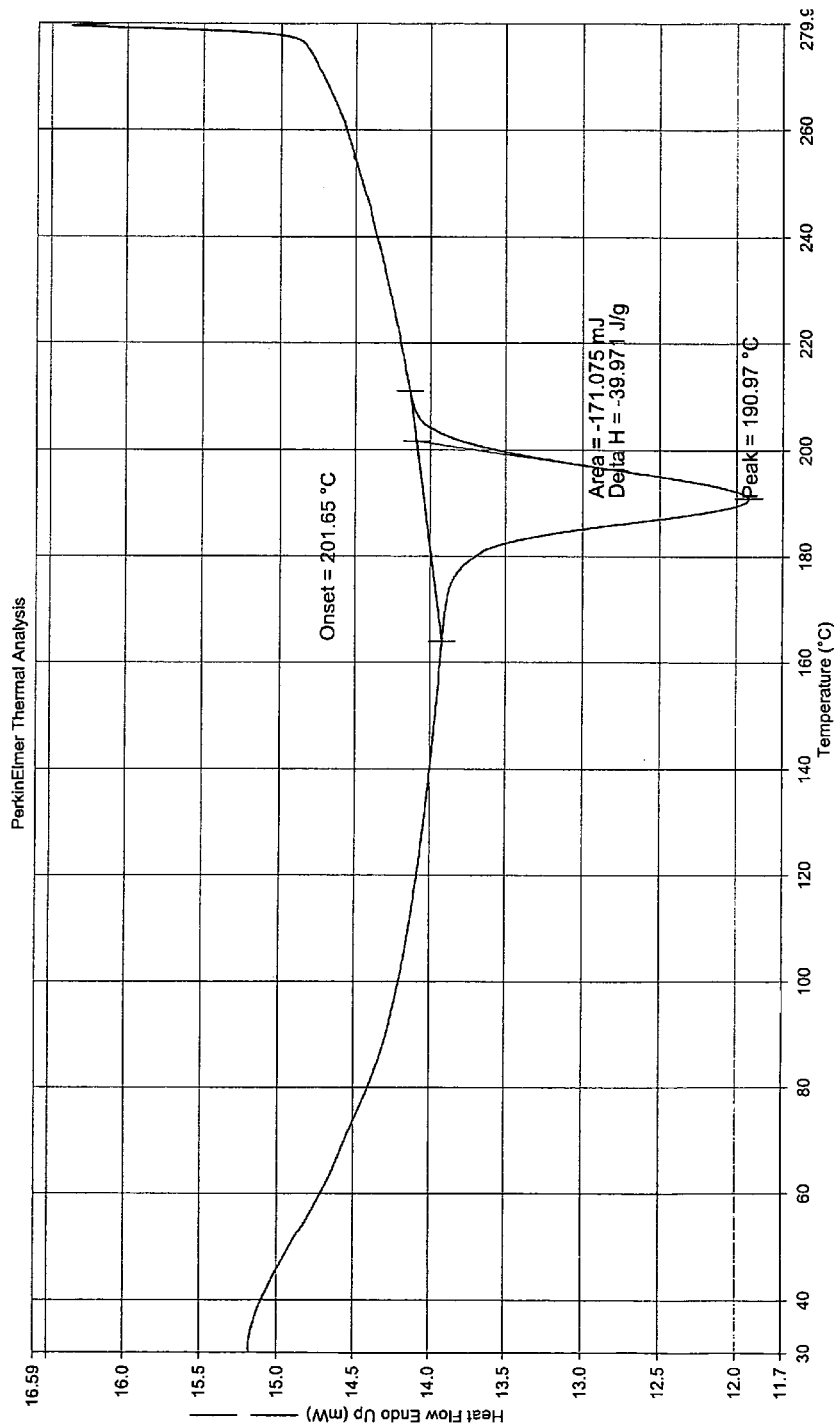

FIGS. 3–4 show that at the comonomer substitution of about 3 percent (i.e., 1.6 mole percent diethylene glycol and 1.5 mole percent isophthalic acid substitution), antimony-catalyzed polyethylene terephthalate polyester possesses a heating crystallization exotherm peak temperature ($T_{CH}$) of 130.6° C., crystalline melting peak temperature ($T_M$) of 251.5° C., and a cooling crystallization exotherm peak temperature ($T_{CC}$) of 191.0° C.

Figure 5:
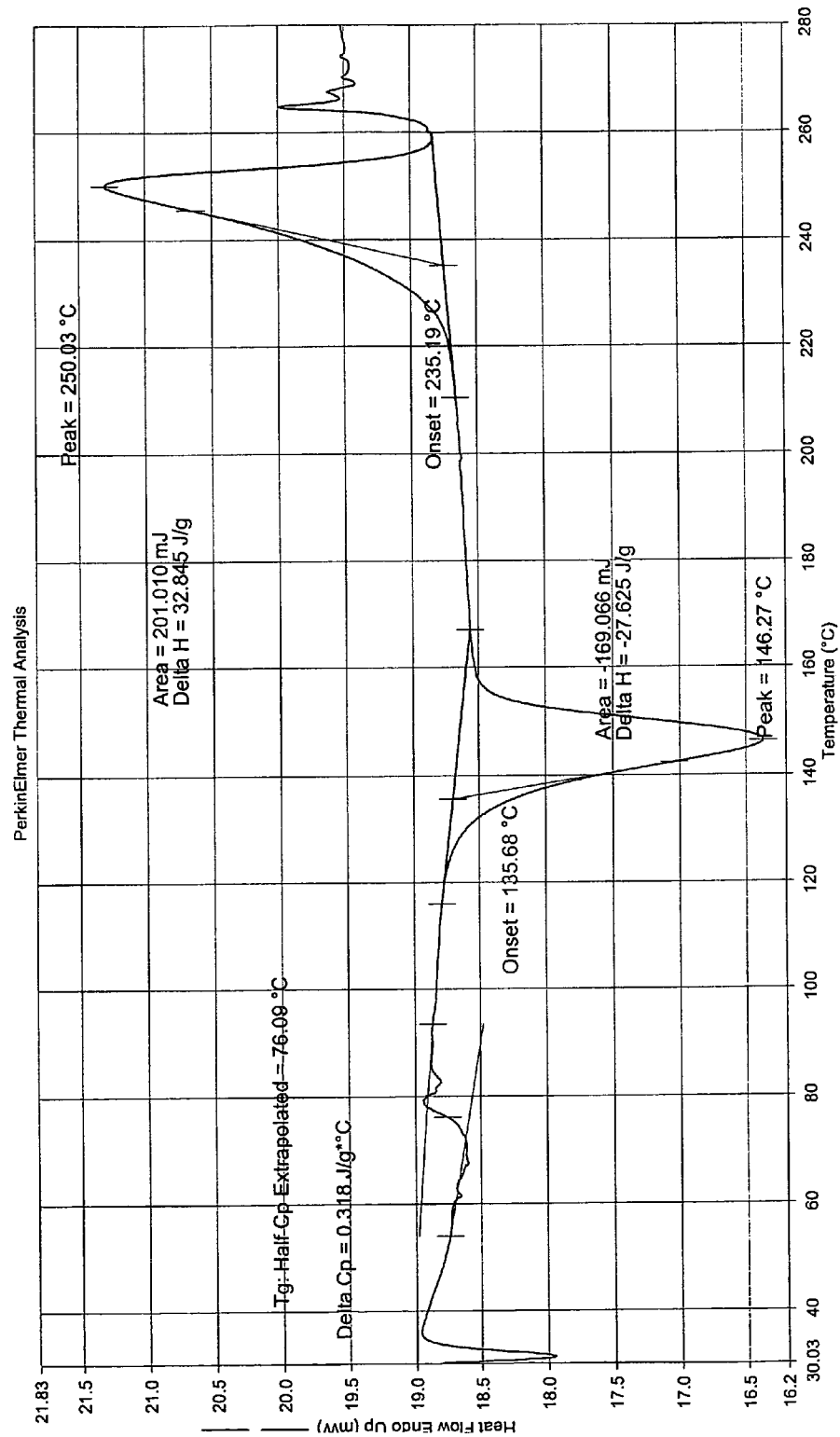
FIGS. 5–6 illustrate differential scanning calorimetry thermal analyses performed on a titanium-catalyzed polyethylene terephthalate resin having an intrinsic viscosity of 0.78 dl/g and being modified with 1.6 mole percent diethylene glycol and 2.4 mole percent isophthalic acid.
Figure 6:
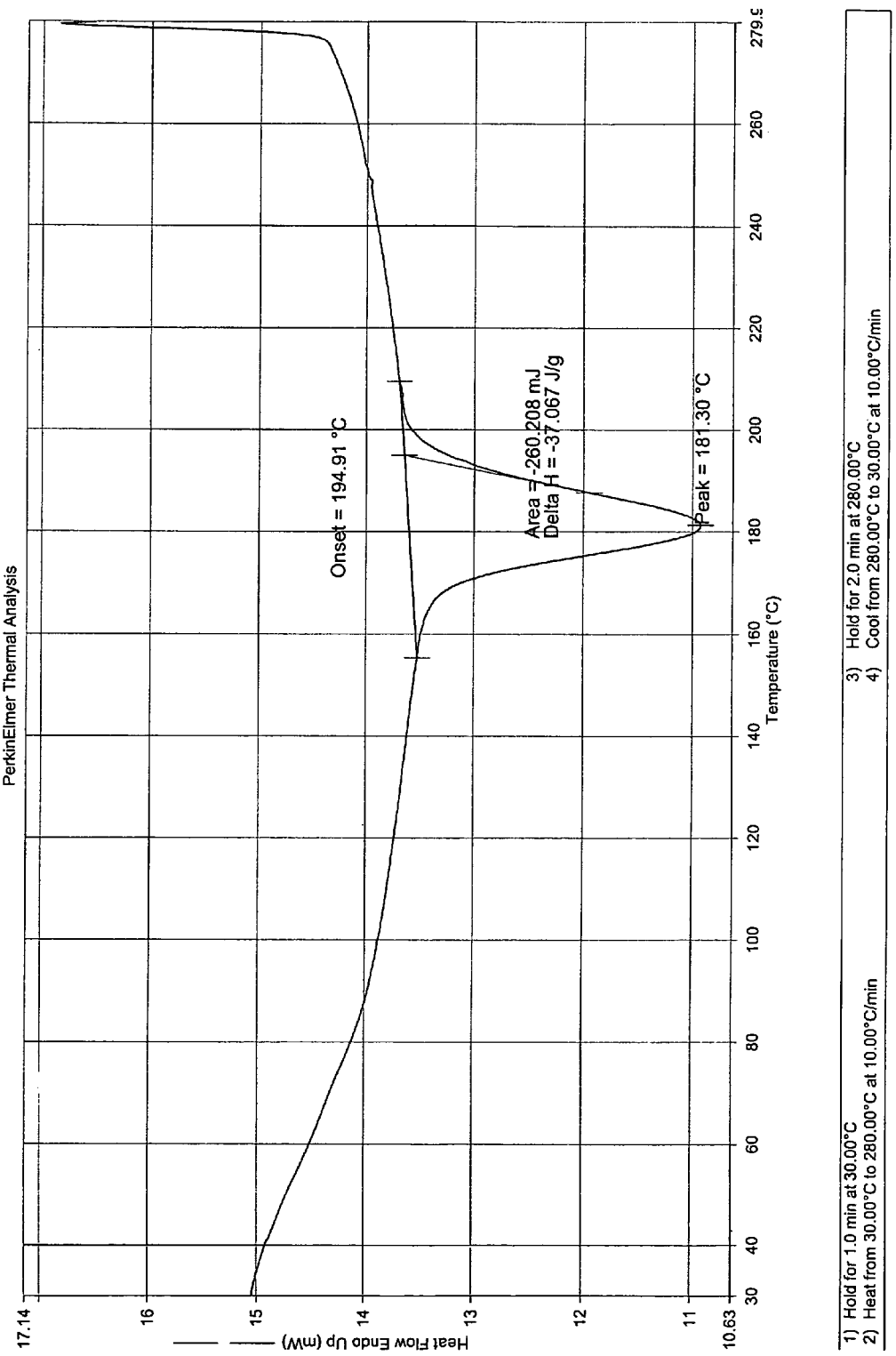

FIGS. 5–6 show that at the comonomer substitution of about 4 percent (i.e., 1.6 mole percent diethylene glycol and 2.4 mole percent isophthalic acid substitution), the titanium-catalyzed polyethylene terephthalate polyester possesses a heating crystallization exotherm peak temperature ($T_{CH}$) of 146.3° C., crystalline melting peak temperature ($T_M$) of 250.0° C., and a cooling crystallization exotherm peak temperature ($T_{CC}$) of 181.3° C.

Figure 7:
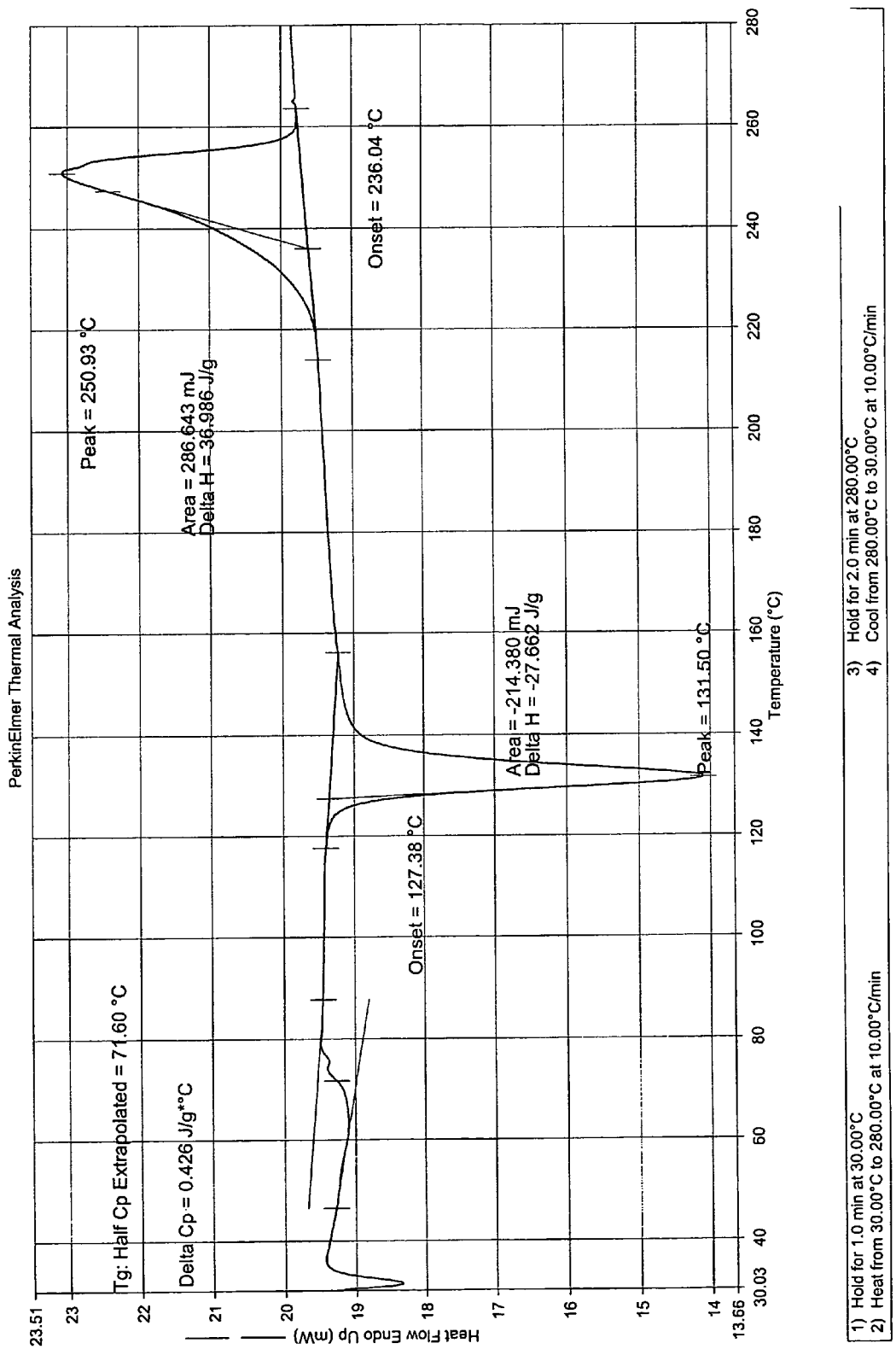
FIGS. 7–8 illustrate differential scanning calorimetry thermal analyses performed on an antimony-catalyzed polyethylene terephthalate resin having an intrinsic viscosity of 0.78 dl/g and being modified with 1.6 mole percent diethylene glycol and 2.4 mole percent isophthalic acid.
Figure 8:
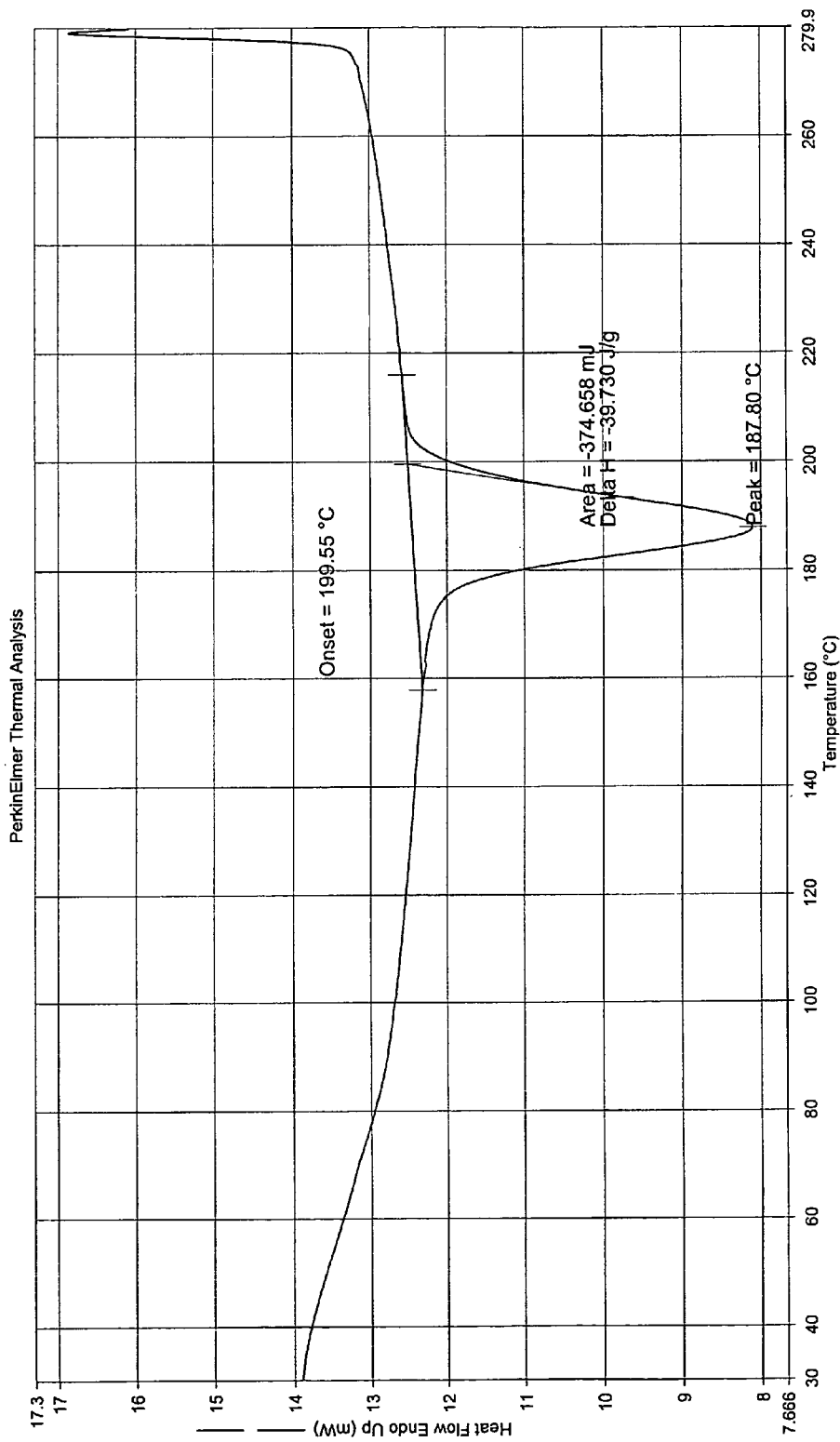

FIGS. 7–8 show that at the comonomer substitution of about 4 percent (i.e., 1.6 mole percent diethylene glycol and 2.4 mole percent isophthalic acid substitution), antimony-catalyzed polyethylene terephthalate polyester possesses a heating crystallization exotherm peak temperature ($T_{CH}$) Of 131.5° C., crystalline melting peak temperature ($T_M$) of 250.9° C., and a cooling crystallization exotherm peak temperature ($T_{CC}$) of 187.8° C.

As FIGS. 1–8 illustrate, the titanium-catalyzed polyethylene terephthalate resins of the present invention possess a significantly higher heating crystallization exotherm peak temperature ($T_{CH}$) as compared with antimony-catalyzed polyethylene terephthalate. Those having ordinary skill in the art will appreciate that this higher heating crystallization exotherm temperature is especially desirable in blow molding operations as it delays the onset of crystallization, thereby facilitating the formation of high-clarity bottles.

Accordingly, at a heating rate of 10° C. per minute as measured by differential scanning calorimetry, the polyethylene terephthalate resin has a heating crystallization exotherm peak temperature ($T_{CH}$) of more than about 140° C. and preferably more than about 142° C. (e.g., between 143° C. and 153° C.). Indeed, the polyethylene terephthalate resin can possess a crystallization exotherm peak temperature ($T_{CH}$) of 155° C. or more. Those having ordinary skill in the art will recognize that heating crystallization exotherm peak temperature ($T_{CH}$) is determined on a non-crystalline polyethylene terephthalate resin.

The polyethylene terephthalate resin also has a crystalline melting peak temperature ($T_M$) of at least about 240° C., typically at least about 245° C., and more typically at least about 250° C. Those having ordinary skill in the art will understand that the melting point is largely dependent on comonomer content.

Moreover, at a cooling rate of 10° C. per minute as measured by differential scanning calorimetry, the polyethylene terephthalate resin has a cooling crystallization exotherm peak temperature ($T_{CC}$) of less than about 190° C. and typically less than about 185° C. In some instances, the polyethylene terephthalate resin has a cooling crystallization exotherm peak temperature ($T_{CC}$) of less than about 180° C.

Figure 9:
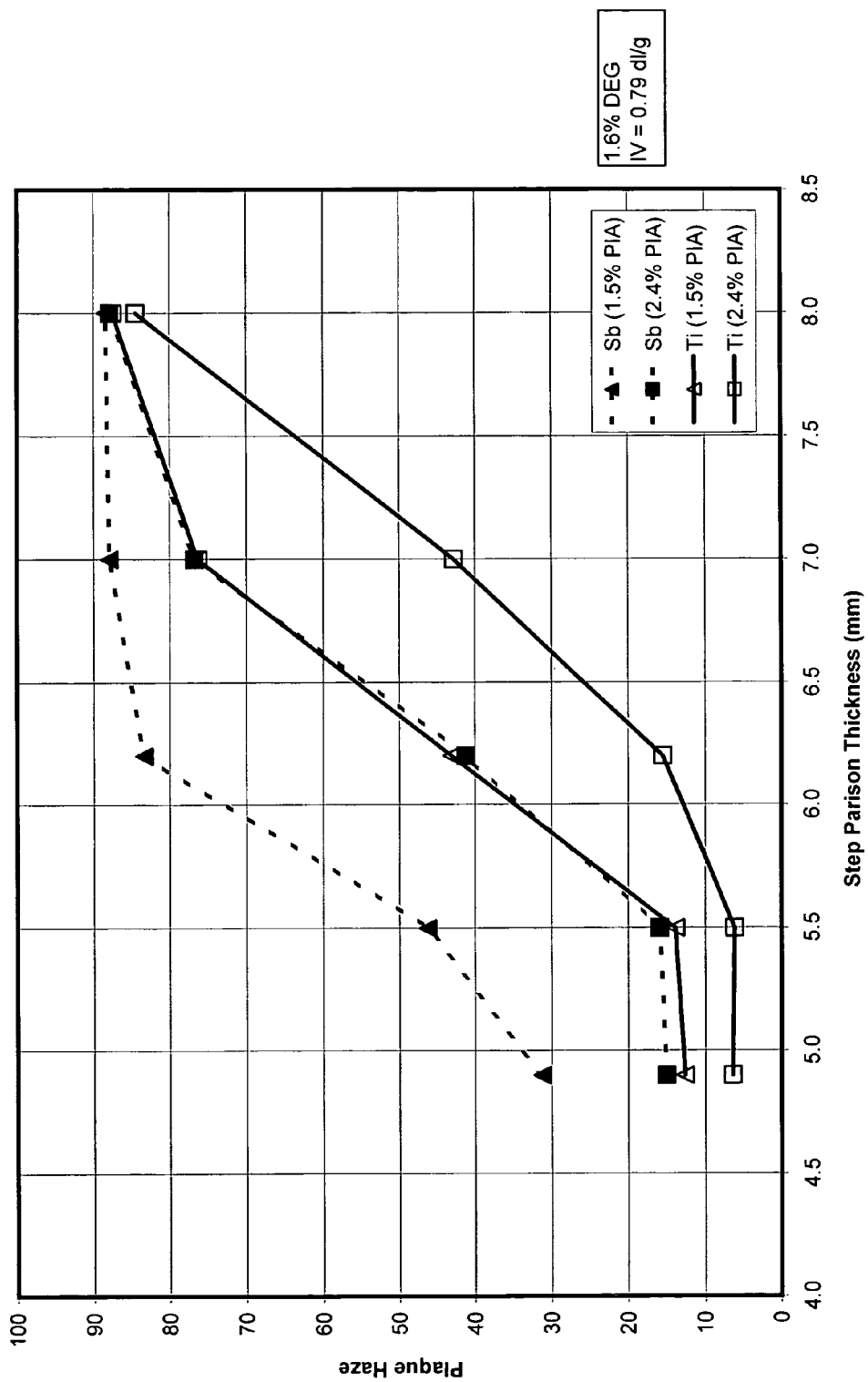
FIG. 9 illustrates percent haze versus preform thickness as measured in a step parison for titanium-catalyzed and antimony-catalyzed polyethylene terephthalate resins.

The titanium-catalyzed polyethylene terephthalate resin of the present invention possesses high clarity as compared with an otherwise identical antimony-catalyzed polyethylene terephthalate resin. In this regard, FIG. 9 depicts percent haze versus preform thickness as measured in a step parison for titanium-catalyzed and antimony-catalyzed polyethylene terephthalate resins at an intrinsic viscosity of about 0.78 dl/g and either 3 mole percent comonomer substitution (i.e., 1.6 mole percent diethylene glycol and 1.5 mole percent isophthalic acid substitution) or 4 mole percent comonomer substitution (i.e., 1.6 mole percent diethylene glycol and 2.4 mole percent isophthalic acid substitution). FIG. 9 illustrates that at a given comonomer substitution, the titanium-catalyzed polyethylene terephthalate resin possesses substantially lower haze as compared with its corresponding antimony-catalyzed polyethylene terephthalate resin. Those having ordinary skill in the art will appreciate that, in general, higher comonomer substitution disrupts polymer crystallinity, thereby reducing preform and bottle haze.

As measured in a step parison, the polyethylene terephthalate of the present invention typically possesses less than about 20 percent haze—preferably less than about 15 percent haze—at a thickness of more than about 6 mm and less than about 5 percent haze at a thickness of more than about 4 mm. Moreover, as measured in a step parison, the polyethylene terephthalate preferably possesses less than about 10 percent haze at a thickness of more than about 4.5 mm, and sometimes at a thickness of more than 5.5 mm (e.g., less than about 10 percent haze at a thickness of between 4.5 and 6.0 mm). In some formulations, the polyethylene terephthalate possesses less than about 20 percent haze at a thickness of between 5.5 and 6.5 mm as measured in a step parison. As depicted in FIG. 9, the polyethylene terephthalate can possess less than about 50 percent haze at a thickness of more than about 7 mm.

Those having ordinary skill in the art understand that polyethylene terephthalate preforms and bottles must possess excellent color (i.e., not too yellow). In this regard, excessive levels of titanium catalyst can cause the polyethylene terephthalate resin to appear yellow.

Color differences are commonly classified according to the L*a*b* color space of the Commission Internationale l'Eclairage (CIE). The three components of this system consist of L*, which describes luminosity on a scale of 0–100 (i.e., 0 is black and 100 is white), a*, which describes the red-green axis (i.e., positive values are red and negative values are green), and b*, which describes the yellow-blue axis (i.e., positive values are yellow and negative values are blue). For characterizing polyester resins, L* and b* values are of particular interest.

In this regard, it is preferred that polyester color be measured after polymerization in the solid phase. After solid state polymerization, the polyethylene terephthalate resin of the present invention possesses an L* value (i.e., luminosity) of more than about 70, preferably more than about 75 (e.g., 77), and most preferably more than about 80 as classified in the CIE L*a*b* color space. In addition, the polyethylene terephthalate resin preferably possesses a b* color value of less than about 2—more preferably less than about 0—as classified by the CIE L*a*b* color space. Most preferably, the polyethylene terephthalate resin possesses a b* color value of between about −3 and 2 as classified by the CIE L*a*b* color space.

Those having ordinary skill in the art will appreciate that although color can be measured in polyester preforms and polyester bottles, color is often more conveniently measured in polyester pellets or polyester plaques. (As set forth herein, the term "pellets" is used generally to refer to chips, pellets, and the like.)

Those having ordinary skill in the art will know that polyethylene terephthalate resins are typically formed into pellets before undergoing crystallization and solid state polymerization. As a result, after solid state polymerization but prior to polymer processing (e.g., injection molding), the polyethylene terephthalate resins of the present invention are crystalline pellets; it is preferred that color be measured in that form. In this regard and unless otherwise indicated (e.g., such as with respect to non-crystalline plaques), the CIE L*a*b* color space values reported herein for the polyethylene terephthalate resins of the present invention relate to crystalline polyethylene terephthalate pellets.

CIE L*a*b* color space values for the crystalline polyethylene terephthalate pellets were determined using a HunterLab LabScan XE spectrophotometer (illuminant/observer: D65/10°; 45°/0° geometry; perfect reflectance diffuser NBS78; standard color tile LX16697). Those having ordinary skill in the art will appreciate that crystalline polyester pellets are translucent and so are typically measured via reflectance using a clear sample cup. In this regard, test procedures (e.g., standards and calibrations) appropriate for measuring color properties of crystalline polyester in various forms (e.g., pellets) are readily available to and within the understanding of those having ordinary skill in the art. See http://www.hunterlab.com/measurement-methods.

As described herein, the polyethylene terephthalate resin of the present invention can be injection molded into preforms, which in turn may be blow molded into bottles. Measuring color in preforms and bottles, however, can be awkward. Consequently, it is preferred that preforms and bottles be formed into plaques to facilitate comparative color measurements. In this regard, the polyethylene terephthalate preforms and bottles according to the present invention are ground, melted at 280° C., and then injected into a cold mold to form standard, three millimeter (3 mm) non-crystalline polyester test plaques. The CIE L*a*b* color space values reported herein for the polyethylene terephthalate preforms and bottles of the present invention relate to measurements taken upon such standard test plaques.

As these standard test plaques are formed from either polyester preforms or polyester bottles, the constituent polyesters may possess unfavorable heat histories. Those having ordinary skill in the art will appreciate that this may somewhat degrade the constituent polyesters. In this regard, it has been observed that injection molding preforms from the crystalline polyethylene terephthalate pellets of the present invention (and thereafter forming standard test plaques) can introduce some yellowing (i.e., the b* color value increases slightly).

Accordingly, the polyethylene terephthalate preforms and bottles of the present invention preferably possess a b* color value of less than about 4—more preferably less than about 2 (e.g., less than about 0)—as classified by the CIE L*a*b* color space. Most preferably, the polyethylene terephthalate preforms and bottles possess a b* color value of between about −3 and 3 as classified by the CIE L*a*b* color space.

Like the aforementioned crystalline polyethylene terephthalate pellets, however, the polyethylene terephthalate preforms and bottles of the present invention possess an L* value of more than about 70, preferably more than about 75 (e.g., 77), and most preferably more than about 80 (e.g., 83 or more) as classified in the CIE L*a*b* color space.

As noted, these CIE L*a*b* color space values for preforms and bottles refer to measurements from standard, non-crystalline polyester test plaques.

CIE L*a*b* color space values for the three-millimeter, non-crystalline polyethylene terephthalate test plaques were determined using a HunterLab LabScan XE spectrophotometer (illuminant/observer: D65/10°; diffuse 8° standard; transmittance port). Those having ordinary skill in the art will appreciate that non-crystalline polyester plaques are essentially transparent and so are measured by transmittance. In this regard, test procedures (e.g., standards and calibrations) appropriate for measuring color properties of non-crystalline polyester in various forms are readily available to and within the understanding of those having ordinary skill in the art. See http://www.hunterlab.com/measurementmethods.

Such color has been achieved according to the present invention by including between about 10 and 50 ppm of elemental cobalt, preferably between about 15 and 40 ppm of elemental cobalt, and most preferably between 20 and 30 ppm of elemental cobalt. In the absence of cobalt, the polyethylene terephthalate resin of the present invention tends to appear yellowish. The present polyethylene terephthalate resin possesses excellent color without the inclusion of colorants, apart from a cobalt catalyst. (Those having ordinary skill in the art will appreciate that cobalt not only provides catalytic activity, but also imparts blue coloration to the polyethylene terephthalate resin.)

Where the polyethylene terephthalate resin is intended for packaging (e.g., polyester preforms and bottles), it preferably includes a heat-up rate additive. In this regard, the heat-up rate additive is present in the resin in an amount sufficient to improve the resin's reheating profile. As will be understood by those having ordinary skill in the art, a heat-up rate additive helps preforms absorb energy during preform reheating processes. In reheating preforms, the inside of the preform should be at least as warm as the outside of the preform as the inside undergoes more stretching during blow molding.

To those having ordinary skill in the art, it is counterintuitive to use a slow-crystallizing polyethylene terephthalate resin in the production of heat-set bottles. For example, U.S. Pat. No. 6,699,546 (Tseng) teaches the inclusion of nucleation agents to accelerate the rate of resin crystallization for improved heat-set bottles.

As explained previously, slow-crystallizing polyethylene terephthalate resins possess a significantly higher heating crystallization exotherm peak temperature ($T_{CH}$) as compared with those of antimony-catalyzed polyethylene terephthalate resins. The objective of the heat-setting process is to maximize bottle crystallinity and stress relaxation while maintaining clarity. It would seem that a slower crystallizing resin would have inferior heat-setting capability. Consequently, including a heat-up rate additive to achieve higher preform temperatures—and thus promoting crystallinity in the slower crystallizing resin—would seem to be of no practical benefit. Under such circumstances, those having ordinary skill in the art would not expect to achieve improved bottle properties (e.g., clarity and shrinkage).

For example, consider a bottle preform made from a slow-crystallizing polyethylene terephthalate resin (e.g., the titanium-catalyzed polyester resins herein disclosed) that further includes a heat-up rate additive. As noted, compared with antimony, titanium slows the onset of thermal crystallization in the preform as the preform is heated. The heat-up rate additive, however, causes the preform to absorb more energy and, therefore, to reach significantly higher temperatures before the onset of crystallization. Thus, good preform clarity is maintained even at elevated preform temperatures.

Surprisingly, the inventors have discovered that modifying a slow-crystallizing polyester resin to include sufficient heat-up rate additive to enhance the resin's reheating profile actual improves blow molding performance and bottle properties, such as shrinkage. The increased preform temperature in the blow molding and heat-setting processes promotes bottle crystallization and stress relaxation while producing bottles having clarity superior to those of antimony-catalyzed polyethylene terephthalate resins.

In one embodiment, the heat-up rate additive is a carbon-based heat-up rate additive. Carbon-based heat-up rate additive is typically present in the polyethylene terephthalate resin in an amount less than about 25 ppm. More preferably, carbon-based heat-up rate additive is present in the polyethylene terephthalate resin in an amount between about 4 and 16 ppm (e.g., 8–12 ppm), most preferably in an amount between about 6 and 10 ppm. Suitable carbon-based additives include carbon black, activated carbon, and graphite. For example, satisfactory carbon black heat-up rate additives are disclosed in U.S. Pat. No. 4,408,004 (Pengilly), which is hereby incorporated entirely by reference.

In another embodiment, the heat-up rate additive is a metal-containing heat-up rate additive. Metal-containing heat-up rate additive is typically present in the polyethylene terephthalate resin in an amount between about 10 and 300 ppm, more typically in an amount greater than about 75 ppm (e.g., between about 150 and 250 ppm). Suitable metal containing heat-up rate additives include metals, metal oxides, minerals (e.g., copper chromite spinels), and dyes. For example, satisfactory inorganic black pigments and particles are disclosed in U.S. Pat. No. 6,503,586 (Wu), which is hereby incorporated entirely by reference.

Preferred metal-containing heat-up rate additives are tungsten-based additives, such as tungsten metal or tungsten carbide. In this regard, tungsten-containing heat-up rate additive powders preferably have an average particle size of between about 0.7 and 5.0 microns, more preferably between about 0.9 and 2.0 microns.

As will be understood by those familiar with this art, particle size is typically measured by techniques based on light scattering. Particle sizes and distributions are often characterized according to ASTM B330-2 ("Standard Test Method for Fisher Number of Metal Powders and Related Compounds").

Other preferred metal-containing heat-up rate additives are molybdenum-based additives, especially molybdenum sulfide ($MOS_2$). In this regard, molybdenum sulfide has outstanding heat absorption properties, so it can be included in somewhat lesser quantities (e.g., 5–100 ppm) as compared with other metal-containing heat-up rate additives.

The most preferred heat-up rate additives are natural spinels and synthetic spinels. Spinels are preferably included in the polyethylene terephthalate resin in an amount between about 10 and 100 ppm (e.g., between about 15 and 25 ppm).

Particularly outstanding spinel pigments are copper chromite black spinel and chrome iron nickel black spinel.

These spinels are disclosed in commonly assigned U.S. patent application Ser. No. 09/247,355, for Thermoplastic Polymers with Improved Infrared Reheat Properties, filed Feb. 10, 1999, now abandoned, and its divisions: U.S. patent application Ser. No. 09/973,499, published as U.S. Patent Publication 2002/0011694 A1 on Jan. 31, 2002; U.S. patent application Ser. No. 09/973,520, published as U.S. Patent Publication 2002-0027314 A1 on Mar. 7, 2002: and U.S. patent application Ser. No. 09/973,436, published as U.S. Patent Publication 2002-0033560 A1 on Mar. 21, 2002. Each of these patent applications and patent publications is hereby incorporated entirely by reference.

The heat-up rate of a polyethylene terephthalate preform can be described by surface temperature measurements at a fixed location on a preform for a particular bottle production rate.

In polyethylene terephthalate bottle production, polyethylene terephthalate bottle preforms are reheated by passing the preforms through a reheat oven of a blow molding machine. The reheat oven consists of a bank of quartz lamps (3,000 and 2,500 watt lamps) that emit radiation mostly in the infrared range. The ability of the preform to absorb this radiation and convert it into heat, thereby allowing the preform to reach the orientation temperature for blow molding, is important for optimum bottle performance and efficient production. Important bottle properties for bottle performance are material distribution, orientation, and sidewall crystallinity.

Preform reheat temperature is important for control of these properties. Depending on the kind of bottle being produced, the preform reheat temperature is typically in the range of 30–50° C. above the glass transition temperature ($T_g$) of polyethylene terephthalate. The reheat temperature depends on the application (e.g., hot-filled beverage bottle or carbonated soft drink bottles). The rate at which a preform can be reheated to the orientation temperature is important for optimal bottle performance in high-speed, polyethylene terephthalate blow-molding machines, such as those manufactured by Sidel, Inc. (LeHavre, France). This is especially true for heat-set bottles that are intended for filling with hot liquids in excess of 185° F. In heat-set bottle production, the preform is reheated rapidly to as high a temperature as possible. This maximizes crystallization upon blow molding and avoids thermal crystallization in the preform. Those having ordinary skill in the art will appreciate that such thermal crystallization can cause unacceptable haze as a result of spherulitic crystallization.

In view of the importance of preform reheating, the following method has been used to assess the reheat characteristics of polyethylene terephthalate preforms. As initial matter, this test method analyzes the reheat characteristics of polyethylene terephthalate preforms (or resins) by forming test parisons from one or more polyethylene terephthalate resin formulations. It is the test parisons—not commercial preforms—that are actually tested:

First, the subject resin is formed into a 5.25-inch test parison having a weight of 47 grams, an overall diameter of 1.125 inches, and a 0.75-inch neck finish. To form such a test parison, a polyethylene terephthalate resin is dried at 350° F. for four hours in a desiccant dryer. The dried resin is introduced into a 4-ounce Newbury injection-molding machine. The resin is kneaded and melted to provide a molten resin with a temperature in the range of 500° F. to 520° F. Then, the molten resin is injected into a preform mold designed for a two-liter carbonated soft drink bottle. The total cycle time is 60 seconds, including injection, pack, and cooling time. The mold is continuously chilled to 45° F. These injection molding conditions give a clear test parison that is predominately amorphous (i.e., less than about 4 percent crystallinity).

The reheat performance of the 5.25-inch test parison is tested using a Sidel SBO1 laboratory blow molding machine. This machine has one reheat oven with a bank of up to ten independently adjustable quartz lamps, an infrared camera to measure preform surface temperature, a transfer arm form the oven to blow mold, one blow mold, and a bottle transfer arm extending from the blow mold to the machine exit.

In this test method, the SBO1 laboratory blow molding machine continuously produces polyethylene terephthalate bottles at a rate of 1,000 bottles per hour using eight quartz lamps. The oven has power control that can be adjusted as a percentage of the overall oven power output. Likewise, each lamp can be adjusted as a percentage of the individual lamp power output.

To determine the reheat characteristics of a 5.25-inch parison, the machine is set up at a bottle production rate of 1,000 bottles per hour. A standard resin is selected to produce a test parison. Then, the reheating profile for this test parison is established. The reheating profile is used to produce commercially acceptable bottles at an overall power output of 80 percent. Thereafter, the percentage of the overall power is varied between 65 and 90 percent and the surface temperature is repeatedly measured at a fixed location on the test parison.

The reheat performance of the 5.25-inch test parison is consistently measured 1.4-inches below the support ring of the neck finish. At this location, (i.e., 1.4 inches below the support ring), the test parison has a wall thickness of 0.157-inch.

EXAMPLE 1

A two-liter polyethylene terephthalate bottle test parison was produced from a standard resin (i.e., Wellman's PermaClear® HP806 polyester resin). This test parison required eight reheat zones for production of a straight-wall, two-liter bottle. At an overall oven power percentage of 80 percent, the reheating profile for this PermaClear® HP806 test parison is shown in Table 1:

TABLE 1

| Heating Zones | Power output (%) |
| --- | --- |
| 1 | 74 |
| 2 | 60 |
| 3 | 55 |
| 4 | 55 |
| 5 | 55 |
| 6 | 68 |
| 7 | 86 |
| 8 | 74 |

After establishing this reheating profile, two samples where prepared from an antimony-catalyzed polyethylene terephthalate resin having less than about 6 mole percent comonomer substitution. One sample included about 11 ppm of a carbon based heat-up rate additive (Resin A) and the other sample, a control, included no heat-up rate additive (Resin B). Besides the presence of a heat-up rate additive, Resin A and Resin B were otherwise identical. The reheat performance (i.e., via surface temperature measurements)

for both Resin A and Resin B were then measured (in five-percent increments) at the overall oven power outputs of between 65 and 90 percent:

TABLE 2

| Overall Oven Power Output (%) | Resin A (surface temp. ° C.) | Resin B (surface temp. ° C.) |
|---|---|---|
| 65 | 87.3 | 81.0 |
| 70 | 92.0 | 85.0 |
| 75 | 95.8 | 87.5 |
| 80 | 100.5 | 92.0 |
| 85 | 107.0 | 97.3 |
| 90 | 113.0 | 101.0 |

Table 2 demonstrates that improved preform reheat performance is achieved as a result of the inclusion of a heat-up rate additive.

Accordingly, to improve preform reheat performance, the polyethylene terephthalate resin of the present invention preferably includes a heat-up rate additive in a concentration sufficient for an aforementioned 5.25-inch test parison to achieve reheating surface temperatures that, as measured 1.4 inches below the support ring of the neck finish where the wall thickness is 0.157 inch, are at least about 4° C. higher than corresponding reheating temperatures achievable by an otherwise identical 5.25-inch test parison (i.e., without a heat-up rate additive) as measured on a Sidel SB01 laboratory blow-molding machine operating at a production rate of 1,000 bottles per hour and using eight lamps at overall power levels of 65 percent, 70 percent, 75 percent, 80 percent, 85 percent, and 90 percent, respectively. The difference in respective reheating surface temperatures is more preferably at least about 7° C. and most preferably at least about 10° C.

In another embodiment, the polyethylene terephthalate resin of the present invention preferably includes a heat-up rate additive in a concentration sufficient for an aforementioned 5.25-inch test parison to achieve an average reheating surface temperature that, as measured 1.4 inches below the support ring of the neck finish where the wall thickness is 0.157 inch, is at least about 5° C. higher—preferably 10° C. higher—than the average reheating temperature achievable by an otherwise identical 5.25-inch test parison (i.e., without a heat-up rate additive) as measured on a Sidel SBO1 laboratory blow-molding machine operating at a production rate of 1,000 bottles per hour and using eight lamps at overall power levels between about 65 and 90 percent.

Alternatively, the intrinsic heat-up rate of polyester resin can be described by its characteristic absorption of energy. In this regard, electromagnetic radiation exists across several spectra. For example, electromagnetic radiation can be measured in the ultraviolet, visible, near-infrared, and infrared ranges. The visible light spectrum falls between about 430 nm and 690 nm. This spectrum is bounded by ultraviolet radiation and infrared radiation, respectively. With respect to the reheating profile of polyester, near infrared radiation (NIR) is of particular interest.

More specifically, the intrinsic heat-up rate of polyester resin can be characterized by its absorbance of electromagnetic radiation. Absorbance is described by Beer's Law, which is expressed as equation 1:

$$A = \epsilon \cdot l \cdot c \qquad \text{Eq. 1}$$

wherein
  A is absorbance of electromagnetic radiation by a sample,
  $\epsilon$ is the proportionality constant of the sample (i.e., "molar absorptivity"),
  l is the path length of the sample through which electromagnetic radiation must pass, and
  c is the concentration of the sample (typically measured in moles/liter).

With respect to polyester resin, however, equation 1 can be simplified. For a particular polyester resin, molar absorptivity and sample concentration can be ignored. Moreover, a linear relationship exists between absorbance and path length (i.e., sample thickness). Thus, for a polymer resin, absorbance (A) can be calculated from transmittance (T) as follows:

$$A = \log(100) - \log(\% T) \qquad \text{Eq. 2}$$

Equation 2 is further simplified as expressed in equation 3:

$$A = 2 - \log(\% T) \qquad \text{Eq. 3}$$

In brief, transmittance is the ratio of the intensity of the electromagnetic radiation that passes through the polymer resin to the intensity of the electromagnetic radiation that enters the polymer resin. As reported herein, absorbance, which is calculated from the relationship expressed in equation 3, describes the electromagnetic radiation that a non-crystalline polyethylene terephthalate resin fails to transmit.

As noted previously, the polyethylene terephthalate resins of the present invention generally possess absorbance (A) of at least about 0.18 $cm^{-1}$ at a wavelength of 1100 nm or at a wavelength of 1280 nm. Moreover, the present polyethylene terephthalate resins typically possess absorbance (A) of at least about 0.20 $cm^{-1}$ at a wavelength of 1100 nm or at a wavelength of 1280 nm, preferably possess absorbance (A) of at least about 0.24 $cm^{-1}$ at a wavelength of 1100 nm or at a wavelength of 1280 nm absorbance (A), and more preferably possess absorbance (A) of at least about 0.28 $cm^{-1}$ at a wavelength of 1100 nm or at a wavelength of 1280 nm absorbance (A).

Those having ordinary skill in the art will understand that as used herein the disjunctive (i.e., "or") includes the conjunctive (i.e., "and"). Moreover, with respect to the present disclosure, absorbance is reported for non-crystalline polyester.

In its most preferred embodiments, the polyethylene terephthalate resins possess an absorbance (A) of at least about 0.25 $cm^{-1}$ at a wavelength of 1100 nm or at a wavelength of 1280 nm, and preferably an absorbance (A) of at least about 0.30 $cm^{-1}$ at a wavelength of 1100 nm or at a wavelength of 1280 nm. In some embodiments, the polyethylene terephthalate resins possess an absorbance (A) of at least about 0.30 $cm^{-1}$ at a wavelength of 1100 nm or at a wavelength of 1280 nm, and in particular embodiments an absorbance (A) of at least about 0.40 $cm^{-1}$ at a wavelength of 1100 nm or at a wavelength of 1280 nm. These polyethylene terephthalate resins can be achieved by including between about 10 and 100 ppm of a copper chromite black spinel.

In this regard, absorbance was determined within the visible and NIR spectra for both a non-crystalline unenhanced polyethylene terephthalate resin (PET) and an otherwise identical polyethylene terephthalate resin, albeit enhanced with 22 ppm of a copper chromite black spinel heat-up rate additive (PET/spinel). Table 3 reports absorbance for these polyester resins at 550 nm, 700 nm, 1100 nm, and 1280 nm:

TABLE 3

| | Absorbance (cm$^{-1}$) | | | |
| --- | --- | --- | --- | --- |
| | 550 nm | 700 nm | 1100 nm | 1280 nm |
| PET | 0.209 | 0.170 | 0.145 | 0.144 |
| PET/spinel | 0.399 | 0.374 | 0.314 | 0.314 |

The wavelengths reported in Table 3 are meaningful. In particular, 550 nm falls near the midpoint of the visible light spectrum and 700 nm falls near the upper end of the visible spectrum. Moreover, as depicted in FIGS. 12–13, the absorbance for unenhanced polyethylene terephthalate is nearly flat (i.e., the slope is about 0) at 1100 nm and 1280 nm, thereby facilitating repeatable measurements at these wavelengths within the NIR spectrum.

To enhance color, it is preferred that heat-up rate additives promote the absorption of more NIR radiation and lesser amounts of visible radiation. This can be described by the absorption ratio as herein defined. In brief, for a polyester resin, the absorption ratio is simply the antilog of the absorbance at a first wavelength divided by the antilog of the absorbance at a second wavelength. This is expressed in equation 4:

$$\text{absorption ratio} = (\text{antilog } A_1)/(\text{antilog } A_2) \quad \text{Eq. 4}$$

wherein $A_1$ is absorbance at a first wavelength, and $A_2$ is absorbance at a second wavelength.

With respect to absorption ratio, the first wavelength typically falls within the NIR spectrum (e.g., 1280 nm) and the second wavelength typically falls within the visible spectrum (e.g., 550 nm). Table 4 indicates that the polyethylene terephthalate enhanced with 22 ppm of copper chromite spinel has similar absorption selectivity to that of the unenhanced polyethylene terephthalate, despite having significantly higher absorbance (e.g., absorbance greater than 0.30 cm$^{-1}$ at both 1100 nm and 1280 nm)

TABLE 4

| | Absorption Ratio | | | |
| --- | --- | --- | --- | --- |
| | 1100:550 | 1280:550 | 1100:700 | 1280:700 |
| PET | 0.864 | 0.862 | 0.945 | 0.943 |
| PET/spinel | 0.822 | 0.822 | 0.871 | 0.871 |

The present polyethylene terephthalate resins preferably possess a 1100:550 absorption ratio of at least about 70 percent or a 1280:550 absorption ratio of at least about 70 percent. More preferably, the present polyethylene terephthalate resins possess a 1100:550 absorption ratio of at least about 75 percent or a 1280:550 absorption ratio of at least about 75 percent. In some embodiments, the present polyethylene terephthalate resins preferably possess a 1100:550 absorption ratio of at least about 80 percent or a 1280:550 absorption ratio of at least about 80 percent.

Similarly, the present polyethylene terephthalate resins preferably possess a 1100:700 absorption ratio of at least about 85 percent or a 1280:700 absorption ratio of at least about 85 percent. In some embodiments, the present polyethylene terephthalate resins possess a 1100:700 absorption ratio of at least about 90 percent (e.g., 95 percent or more) or a 1280:700 absorption ratio of at least about 90 percent (e.g., 95 percent or more).

With respect to the present disclosure, absorbance was determined for three millimeter (3 mm), non-crystalline polyester plaques using a Foss Series 6500 Transport Analyzer. This instrument is typical of those capable of measuring transmittance in the visible and NIR spectra in that instrumentation factors (e.g., lamp, detector, vibration, and air filtration) can affect absorbance measurements. Of course, the use of appropriate standards and calibrations is within the understanding of those having ordinary skill in the art.

To control for testing variability, the absorbance data must be normalized at an incident wavelength of 2132 nm such that the corresponding absorbance is 0.473 mm$^{-1}$ (i.e., 4.73 cm$^{-1}$). At this wavelength additives have modest effect on absorbance for non-crystalline polyethylene terephthalate.

The inventors have also considered the effect of sample reflectance, but have determined that it may be disregarded when determining absorbance of polyester resins. In brief, reflectance is radiation that has been scattered from the surface of a solid, liquid, or gas. Reflected electromagnetic energy is expressed in relation to the energy absorbed and energy transmitted as expressed in equation 5:

$$I_O = I_A + I_T + I_R \quad \text{Eq. 5}$$

wherein $I_O$ is incident energy, $I_A$ is absorbed energy, $I_T$ is transmitted energy, and $I_R$ is reflected energy.

As described previously, absorbance is derived from the transmittance. See equation 3. Reflectance is generally not measured, and so the inventors have considered whether ignoring reflectance introduces substantial errors in the determination of absorbance.

In this regard, it would seem that a polyester plaque having a polished surface would have a higher reflectance than would a polyester plaque having a "matte" or other non-reflective finish. If reflectance is not considered, increasing reflectance would seem to decrease transmittance. In accordance with equation 3, this would have the effect of falsely increasing calculated absorbance.

Therefore, to reduce absolute reflectance and control reflectance variability, the polyester plaques should have a consistent finish across batches (i.e., semi-glossy). It is believed that by controlling the physical properties of the polyester plaques in this way, reflectance becomes negligible in assessing absorbance and absorption ratio.

Those having ordinary skill in the art will know that there are two conventional methods for forming polyethylene terephthalate. These methods are well known to those skilled in the art.

One method employs a direct esterification reaction using terephthalic acid and excess ethylene glycol. In this technique, the aforementioned step of reacting a terephthalate component and a diol component includes reacting terephthalic acid and ethylene glycol in a heated esterification reaction to form monomers and oligomers of terephthalic acid and ethylene glycol, as well as a water byproduct. To enable the esterification reaction to go essentially to completion, the water must be continuously removed as it is formed. The monomers and oligomers are subsequently catalytically polymerized via polycondensation to form polyethylene terephthalate polyester. As noted, ethylene glycol is continuously removed during polycondensation to create favorable reaction kinetics.

The other method involves a two-step ester exchange reaction and polymerization using dimethyl terephthalate and excess ethylene glycol. In this technique, the aforementioned step of reacting a terephthalate component and a diol component includes reacting dimethyl terephthalate and ethylene glycol in a heated, catalyzed ester exchange reaction (i.e., transesterification) to form bis(2-hydroxyethyl)-terephthalate monomers, as well as methanol as a byproduct.

To enable the ester exchange reaction to go essentially to completion, the methanol must be continuously removed as it is formed. The bis(2-hydroxyethyl)terephthalate monomer product is then catalytically polymerized via polycondensation to produce polyethylene terephthalate polymers. The resulting polyethylene terephthalate polymers are substantially identical to the polyethylene terephthalate polymer resulting from direct esterification using terephthalic acid, albeit with some minor chemical differences (e.g., end group differences).

Polyethylene terephthalate polyester may be produced in a batch process, where the product of the ester interchange or esterification reaction is formed in one vessel and then transferred to a second vessel for polymerization. Generally, the second vessel is agitated and the polymerization reaction is continued until the power used by the agitator reaches a level indicating that the polyester melt has achieved the desired intrinsic viscosity and, thus, the desired molecular weight. More commercially practicable, however, is to carry out the esterification or ester interchange reactions, and then the polymerization reaction as a continuous process. The continuous production of polyethylene terephthalate results in greater throughput, and so is more typical in large-scale manufacturing facilities.

In the present invention, the direct esterification reaction is preferred over the older, two-step ester exchange reaction, which is less economical and which often yields polyethylene terephthalate resins having poor color.

In this regard and as noted, the direct esterification technique reacts terephthalic acid and ethylene glycol along with no more than 6 mole percent diacid and diol modifiers to form low molecular weight monomers, oligomers, and water. In particular, both titanium and cobalt catalysts preferably are added during esterification as this has been found to improve the color of the resulting polyethylene terephthalate resins. The polyethylene terephthalate resin may optionally include other catalysts, such as aluminum-based catalysts, manganese-based catalysts, or zinc-based catalysts.

More specifically, the titanium catalyst is introduced in an amount sufficient for the final polyethylene terephthalate resin to include between about 2 and 50 ppm of elemental titanium. Likewise, the cobalt catalyst is introduced in an amount sufficient for the final polyethylene terephthalate resin to include between about 10 and 50 ppm of elemental cobalt. To prevent process disruptions (e.g., clogged piping), it is recommended that the titanium and cobalt catalysts be introduced into an esterification vessel by a different delivery means.

The inclusion of a titanium or cobalt catalyst increases the rate of esterification and polycondensation and, hence, the production of the polyethylene terephthalate resins. These catalysts, however, will eventually degrade the polyethylene terephthalate polymer. For example, degradation may include polymer discoloration (e.g., yellowing), acetaldehyde formation, or molecular weight reduction. To reduce these undesirable effects, stabilizing compounds can be employed to sequester ("cool") the catalysts. The most commonly used stabilizers contain phosphorus, typically in the form of phosphates and phosphites.

Accordingly, the present resin typically includes a phosphorus stabilizer. In this regard, the phosphorus stabilizer is preferably introduced into the polyethylene terephthalate polymers such that the phosphorus is present in the resulting resin, on an elemental basis, in an amount less than about 60 ppm, typically between about 2 and 40 ppm, preferably in an amount less than about 15 ppm (e.g., between about 5 and 15 ppm), and more preferably in an amount less than about 10 ppm (i.e., between about 2 and 10 ppm). The phosphorus stabilizer may be introduced into the melt phase any time after esterification, but it is preferred that the phosphorus stabilizer be added to the melt after polycondensation is essentially complete.

Although adding a phosphorus stabilizer to the polymer melt in a batch reactor is a relatively simple process, numerous problems arise if the stabilizers are added in the continuous production of polyethylene terephthalate. For example, while early addition of the stabilizer prevents discoloration and degradation of the polyester, it also causes reduced production throughput (i.e., decreases polycondensation reaction rates). Moreover, phosphorus stabilizers are typically dissolved in ethylene glycol, the addition of which further slows the polymerization process. Consequently, early addition of the stabilizer in the polymerization process requires an undesirable choice between production throughput and thermal stability of the polymer. As used herein, "thermal stability" refers to a low rate of acetaldehyde generation, low discoloration, and retention of molecular weight following subsequent heat treatment or other processing.

Later addition of the phosphorus stabilizer may provide insufficient opportunity for the stabilizer to fully blend with the polymer. Consequently, the phosphorus stabilizer may not prevent degradation and discoloration of the polyester. In addition, adding phosphorus stabilizer during polymer processing is often inconvenient and does not provide economies of scale.

U.S. Pat. No. 5,376,702 for a Process and Apparatus for the Direct and Continuous Modification of Polymer Melts discloses dividing a polymer melt stream into an unmodified stream and a branch stream that receives additives. In particular, a side stream takes a portion of the branch stream to an extruder, where additives are introduced. Such techniques, however, are not only complicated, but also costly, requiring a screw extruder and melt piping to process additives. Consequently, such arrangements are inconvenient and even impractical where total additive concentrations are low (e.g., less than one weight percent).

Certain problems associated with late addition of stabilizer are addressed in U.S. Pat. No. 5,898,058 for a Method of Post-Polymerization Stabilization of High Activity Catalysts in Continuous Polyethylene Terephthalate Production, which discloses a method of stabilizing high activity polymerization catalysts in continuous polyethylene terephthalate production. This patent, which is commonly assigned with this application, is hereby incorporated entirely herein by reference.

In particular, U.S. Pat. No. 5,898,058 discloses adding a stabilizer, which preferably contains phosphorus, at or after the end of the polymerization reaction and before polymer processing. This deactivates the polymerization catalyst and increases the throughput of the polyester without adversely affecting the thermal stability of the polyethylene terephthalate polyester. While a noteworthy improvement over conventional techniques, U.S. Pat. No. 5,898,058 teaches adding the stabilizer without a carrier. Consequently, the addition of solids into the polymer necessitates the costly use of an extruder.

The aforementioned U.S. application Ser. No. 09/738,150 for Methods of Post-Polymerization Injection in Continuous Polyethylene Terephthalate Production, now U.S. Pat. No. 6,599,596, discloses a process for the production of high quality polyethylene terephthalate polyester that improves upon the stabilizer-addition techniques disclosed by commonly assigned U.S. Pat. No. 5,898,058.

More specifically, U.S. application Ser. No. 09/738,150 discloses a method for the late introduction of additives into a process for making polyethylene terephthalate. The additives are introduced during, and preferably after, the polycondensation of polyethylene terephthalate polymers. In particular, the method employs a reactive carrier that not only functions as a delivery vehicle for one or more additives, but also reacts with the polyethylene terephthalate, thereby binding the carrier in the polyethylene terephthalate resin. Moreover, U.S. application Ser. No. 09/738,150 discloses that this may be achieved using a simplified additive delivery system that does not require the use of an extruder. (U.S. application Ser. No. 09/932,150, for Methods of Post-Polymerization Extruder Injection in Polyethylene Terephthalate Production, now U.S. Pat. No. 6,569,991, which is a continuation-in-part of U.S. application Ser. No. 09/738,150, discloses a method for late additive introduction at an extruder during a process for making polyethylene terephthalate.)

The phosphorus stabilizers herein disclosed can be introduced to the polyethylene terephthalate polymers directly, as a concentrate in polyethylene terephthalate, or as a concentrate in a liquid carrier. The preferred point of addition in the polyethylene terephthalate polymerization process is after completion of polycondensation (i.e., mixed with the molten polymer stream after the final polymerization vessel).

The phosphorus stabilizer is preferably introduced to the polyethylene terephthalate polymers via a reactive carrier, rather than via an inert carrier or no carrier at all. The reactive carrier, which preferably has a molecular weight of more than about 200 g/mol and less than about 10,000 g/mol may be introduced during polycondensation, or more preferably, after the polycondensation is complete. In either respect, the reactive carrier should be introduced to the polyethylene terephthalate polymers in quantities such that bulk polymer properties are not significantly affected.

As a general matter, the reactive carrier should make up no more than about one weight percent of the polyethylene terephthalate resin. Preferably, the reactive carrier is introduced to the polyethylene terephthalate polymers in quantities such that its concentration in the polymer resin is less than about 1,000 ppm (i.e., 0.1 weight percent). Reducing the reactive carrier to quantities such that its concentration in the polymer resin is less than 500 ppm (i.e., 0.05 weight percent) will further reduce potential adverse effects to bulk polymer properties.

Most preferably, the reactive carrier has a melting point that ensures that it is a liquid or slurry at near ambient temperatures. Near ambient temperatures not only simplify the unit operations (e.g., extruders, heaters, and piping), but also minimize degradation of the inert particulate additives. As used herein, the term "near ambient" includes temperatures between about $20°$ C. and 60° C.

In general, reactive carriers having carboxyl, hydroxyl, or amine functional groups are favored. Preferred are polyols, especially polyester polyols and polyether polyols, having a molecular weight that is sufficiently high such that the polyol will not substantially reduce the intrinsic viscosity of the polyethylene terephthalate polymer, and a viscosity that facilitates pumping of the polyol. Polyethylene glycol is a preferred polyol. Other exemplary polyols include functional polyethers, such as polypropylene glycol that is prepared from propylene oxide, random and block copolymers of ethylene oxide and propylene oxide, and polytetramethylene glycol that is derived from the polymerization of tetrahydrofuran.

Alternatively, the reactive carrier may include dimer or trimer acids and anhydrides. In another embodiment, the reactive carrier may possess, in addition to or in place of terminal functional groups, internal functional groups (e.g., esters, amides, and anhydrides) that react with the polyethylene terephthalate polymers. In yet another embodiment, the reactive carrier may include non-functional esters, amides, or anhydrides that is capable of reacting into the polyethylene terephthalate polymers during solid state polymerization and that will not cause the polyethylene terephthalate polymers to suffer intrinsic viscosity loss during injection molding processes.

In view of the foregoing, a preferred method of making the titanium-catalyzed polyethylene terephthalate resin of the present invention includes reacting, in a heated esterification reaction, a diacid component that includes at least 94 mole percent terephthalic acid and a diol component that includes at least 94 mole percent ethylene glycol. The diacid and diol modifiers should be included such that the resulting polyethylene terephthalate polymer has less than about 6 mole percent comonomer substitution. For example, the diacid component preferably includes between about 1.6 and 2.4 mole percent isophthalic acid with the remainder terephthalic acid, and the diol component of includes 1.6 mole percent diethylene glycol and the remainder ethylene glycol.

The esterification reaction is catalyzed by both titanium and cobalt to form monomers and oligomers of terephthalic acid and diacid modifiers, and ethylene glycol and diol modifiers, as well as water, which is continuously removed as it is formed to enable the esterification reaction to go essentially to completion. The titanium catalyst and the cobalt catalyst are concurrently introduced in amounts sufficient for the polyethylene terephthalate resin to include between about 2 and 50 ppm (e.g., 5–15 ppm) of elemental titanium and between about 10 and 50 ppm of elemental cobalt (e.g., 20–30 ppm).

The monomers and oligomers are then polymerized via melt phase polycondensation to form polyethylene terephthalate polymers. A phosphorus stabilizer is then introduced into the polyethylene terephthalate polymers, preferably using a reactive carrier. As noted, the reactive carrier facilitates uniform blending within the polymer melt. The phosphorus stabilizer is typically introduced into the polyethylene terephthalate polymers such that the phosphorus is present in the resulting resin, on an elemental basis, in an amount between about 2 and 60 ppm—preferably less than about 10 or 15 ppm. Thereafter, the polyethylene terephthalate polymers are formed into pellets, which are then polymerized in the solid state to an intrinsic viscosity of less than 0.86 dl/g (e.g., 0.75–0.78 dl/g).

Preferably, the reactive carrier is a polyol (e.g., polyethylene glycol) having a molecular weight that permits the polyol to be pumped at near ambient temperatures (e.g., less than 60° C.) and that is introduced to the polyethylene terephthalate polymers in quantities such that bulk properties of the polyethylene terephthalate polymers are not significantly affected (e.g., quantities such that its concentration in the polymers is less than about one weight percent). The polyethylene terephthalate polymers are then formed into chips (or pellets via a polymer cutter) before being solid state polymerized. Importantly, the polyol reactive carrier combines with the polyethylene terephthalate polymer such that it is non-extractable during subsequent processing operations (e.g., forming polyester preforms or beverage containers).

Other additives can be incorporated via reactive carrier into the polyethylene terephthalate resins of the present invention. Such additives include preform heat-up rate enhancers, friction-reducing additives, UV absorbers, inert particulate additives (e.g., clays or silicas), colorants, antioxidants, branching agents, oxygen barrier agents, carbon dioxide barrier agents, oxygen scavengers, flame retardants, crystallization control agents, acetaldehyde reducing agents, impact modifiers, catalyst deactivators, melt strength enhancers, anti-static agents, lubricants, chain extenders, nucleating agents, solvents, fillers, and plasticizers.

Late addition is especially desirable where the additives are volatile or subject to thermal degradation. Conventional additive injection prior to polycondensation, such as during an esterification stage in the synthesis of polyester, or early during the polycondensation stage subjects additives to several hours of high-temperature (greater than 260° C.) and reduced-pressure (less than 10 torr) conditions. Consequently, additives that have significant vapor pressure at these conditions will be lost from the process. Advantageously, late addition via reactive carrier significantly reduces the time additives are exposed to high polycondensation temperatures.

As will be understood by those of ordinary skill in the art, macromolecules are considered to be polymers at an intrinsic viscosity of about 0.45 dl/g. This roughly translates to a molecular weight of at least about 13,000 g/mol. In contrast, the reactive carriers according to the present invention have molecular weights that are more than about 200 g/mol and less than about 10,000 g/mol. The molecular weight of the reactive carrier is typically less than 6,000 g/mol, preferably less than 4,000 g/mol, more preferably between about 300 and 2,000 g/mol, and most preferably between about 400 and 1,000 g/mol. As used herein, molecular weight refers to number-average molecular weight, rather than weight-average molecular weight.

Figure 10:
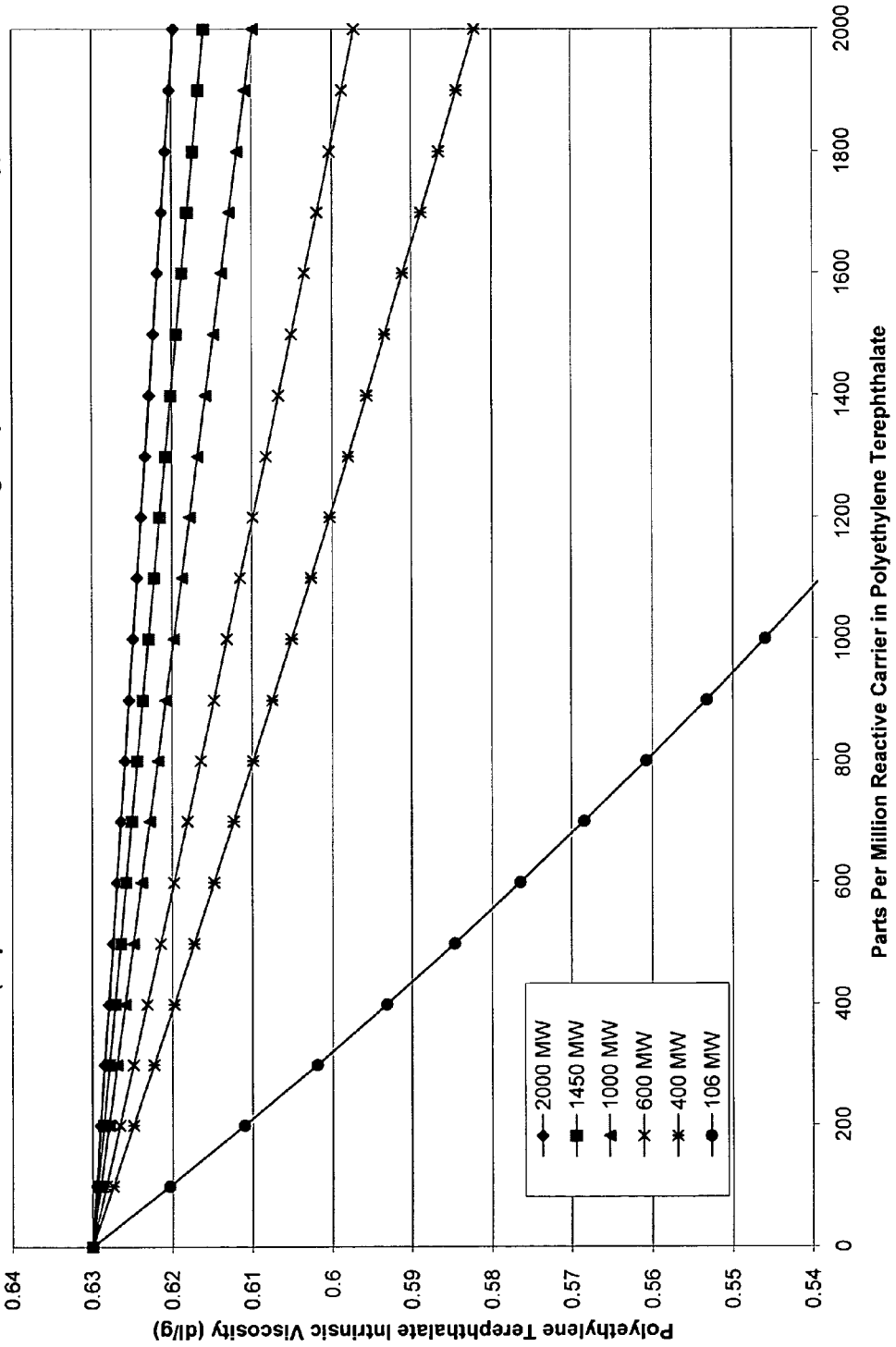
FIG. 10 illustrates the theoretical loss of intrinsic viscosity of polyethylene terephthalate having an intrinsic viscosity of 0.63 dl/g as a function of the concentration of the reactive carrier at various molecular weights.
Figure 11:
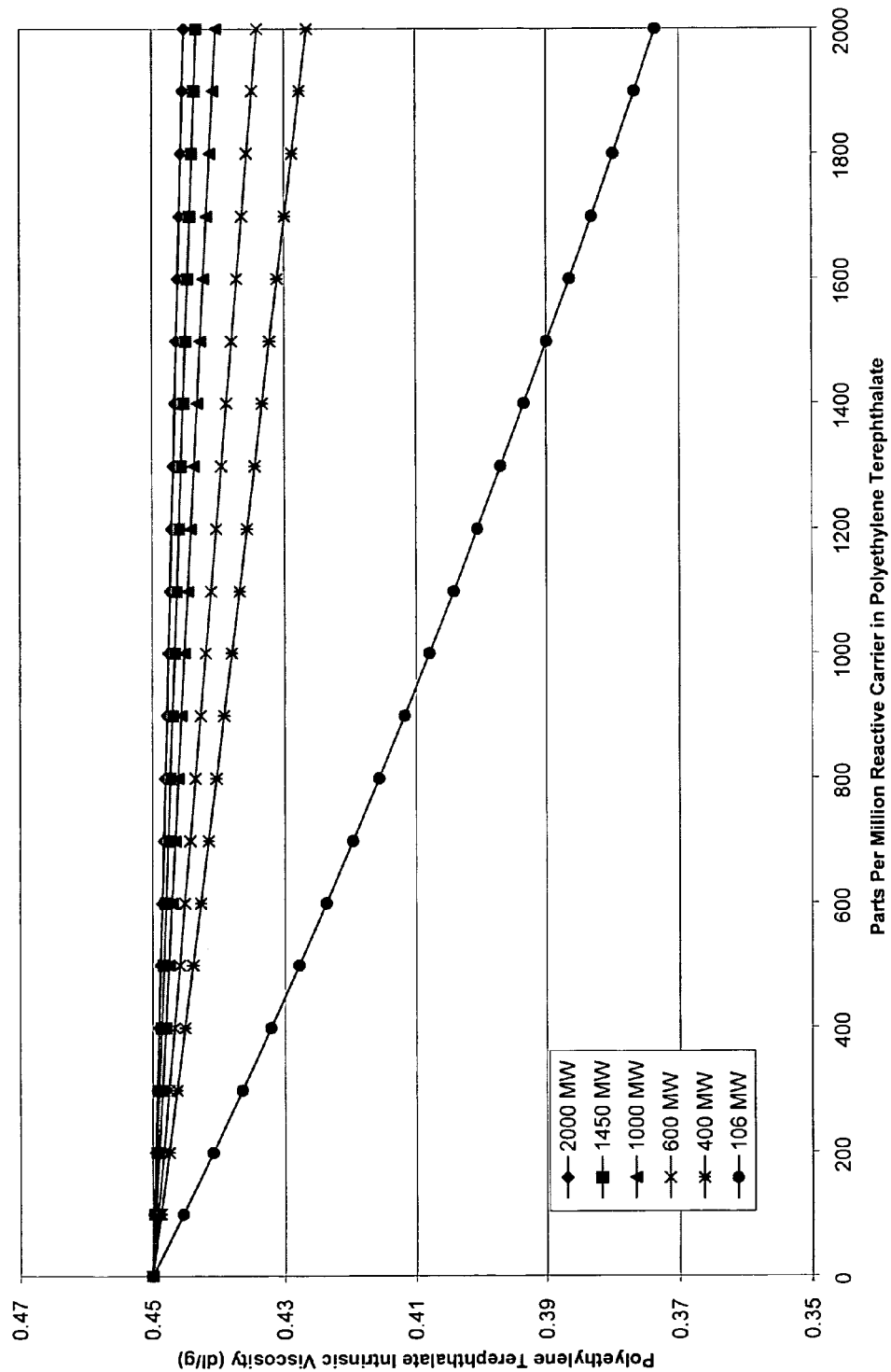
FIG. 11 illustrates the theoretical loss of intrinsic viscosity of polyethylene terephthalate having an intrinsic viscosity of 0.45 dl/g as a function of the concentration of the reactive carrier at various molecular weights.

FIGS. 10 and 11 illustrate the theoretical loss of intrinsic viscosity as a function of reactive carrier concentration at several molecular weights. FIG. 10 depicts the impact of the reactive carrier on upon polyethylene terephthalate having an intrinsic viscosity of 0.63 dl/g. Similarly, FIG. 11 depicts the impact of the reactive carrier on upon polyethylene terephthalate having intrinsic viscosity of 0.45 dl/g. Note that at any concentration, the reactive carriers having higher molecular weights have less adverse effect upon intrinsic viscosity of the polymer resin.

In a typical, exemplary process the continuous feed enters the direct esterification vessel that is operated at a temperature of between about 240° C. and 290° C. and at a pressure of between about 5 and 85 psia for between about one and five hours. The esterification reaction, which is preferably catalyzed using both titanium and cobalt catalysts, forms low molecular weight monomers, oligomers, and water. The water is removed as the reaction proceeds to drive favorable reaction equilibrium.

Thereafter, the low molecular weight monomers and oligomers are polymerized via polycondensation to form polyethylene terephthalate polyester. This polycondensation stage generally employs a series of two or more vessels and is operated at a temperature of between about 250° C. and 305° C. for between about one and four hours. The polycondensation reaction usually begins in a first vessel called the low polymerizer. The low polymerizer is operated at a pressure range of between about 0 and 70 torr. The monomers and oligomers polycondense to form polyethylene terephthalate and ethylene glycol.

The ethylene glycol is removed from the polymer melt using an applied vacuum to drive the reaction to completion. In this regard, the polymer melt is typically agitated to promote the escape of the ethylene glycol from the polymer melt and to assist the highly viscous polymer melt in moving through the polymerization vessel.

As the polymer melt is fed into successive vessels, the molecular weight and thus the intrinsic viscosity of the polymer melt increases. The temperature of each vessel is generally increased and the pressure decreased to allow greater polymerization in each successive vessel.

The final vessel, generally called the "high polymerizer," is operated at a pressure of between about 0 and 40 torr. Like the low polymerizer, each of the polymerization vessels is connected to a vacuum system having a condenser, and each is typically agitated to facilitate the removal of ethylene glycol. The residence time in the polymerization vessels and the feed rate of the ethylene glycol and terephthalic acid into the continuous process is determined, in part, based on the target molecular weight of the polyethylene terephthalate polyester. Because the molecular weight can be readily determined based on the intrinsic viscosity of the polymer melt, the intrinsic viscosity of the polymer melt is generally used to determine polymerization conditions, such as temperature, pressure, the feed rate of the reactants, and the residence time within the polymerization vessels.

Note that in addition to the formation of polyethylene terephthalate polymers, side reactions occur that produce undesirable by-products. For example, the esterification of ethylene glycol forms diethylene glycol, which is incorporated into the polymer chain. As is known to those of skill in the art, diethylene glycol lowers the softening point of the polymer. Moreover, cyclic oligomers (e.g., trimer and tetramers of terephthalic acid and ethylene glycol) may occur in minor amounts. The continued removal of ethylene glycol as it forms in the polycondensation reaction will generally reduce the formation of these by-products.

After the polymer melt exits the polycondensation stage, typically from the high polymerizer, phosphorus stabilizer is introduced via a reactive carrier. Thereafter, the polymer melt is generally filtered and extruded. After extrusion, the polyethylene terephthalate is quenched, preferably by spraying with water, to solidify it. The solidified polyethylene terephthalate polyester is cut into chips or pellets for storage and handling purposes. The polyester pellets preferably have an average mass of about 15–20 mg. As used herein, the term "pellets" is used generally to refer to chips, pellets, and the like.

Although the prior discussion assumes a continuous production process, it will be understood that the invention is not so limited. The teachings disclosed herein may be applied to semi-continuous processes and even batch processes.

As will be known to those of skill in the art, the pellets formed from the polyethylene terephthalate polymers may be subjected to crystallization followed by solid state polymerization to increase the molecular weight of the polyethylene terephthalate resin. As compared with antimony, for example, titanium is substantially less active as an SSP catalyst. Thus, to facilitate the solid phase polymerization of the polyethylene terephthalate resins, complementary SSP catalysts are introduced to the polymer melt prior to solid phase polymerization, preferably during polycondensation.

Preferred SSP catalysts include Group I and Group II metals. Acetate salts of Group I and Group II metals (e.g., calcium acetate, lithium acetate, manganese acetate, potassium acetate, or sodium acetate) or terephthalate salts can increase solid state polymerization rates. The SSP catalyst is typically introduced in an amount sufficient for the final polyethylene terephthalate resin to include between about 10 and 70 ppm of the elemental metal.

After solid state polymerization, the polyester chips are then re-melted and re-extruded to form bottle preforms, which can thereafter be formed into polyester containers (e.g., beverage bottles). Bottles formed from the resins and preforms described herein preferably have sidewall haze of less than about 15 percent, more preferably less than about 10 percent.

Typically, a hot-fill bottle according to the present invention, exhibits an average circumferential dimension change, as measured from the bottle shoulder to the bottle base, of less than about 3 percent when filled at 195° F. and less than about 5 percent when filled at 205° F. Moreover, such a hot-fill bottle according to the present invention exhibits a maximum circumferential dimension change from the bottle shoulder to the bottle base of less than about 5 percent— preferably less than 4 percent—when the bottle is filled at 195° F. (Such shrinkage properties are measured on a 24-hour aged bottle.)

As will be understood by those having ordinary skill in the art, polyethylene terephthalate is typically converted into a container via a two-step process. First, an amorphous bottle preform (e.g., less than about 4 percent crystallinity and typically between about 4 and 7 mm in thickness) is produced from bottle resin by melting the resin in an extruder and injection molding the molten polyester into a preform. Such a preform usually has an outside surface area that is at least an order of magnitude smaller than the outside surface of the final container. The preform is reheated to an orientation temperature that is typically 30° C. above the glass transition temperature ($T_g$).

The reheated preform is then placed into a bottle blow mold and, by stretching and inflating with high-pressure air, formed into a heated bottle. The blow mold is maintained at a temperature between about 115° C. and 200° C., usually between about 120° C. and 160° C. Those having ordinary skill in the art will recognize that the introduction of compressed air into the heated preform effects formation of the heated bottle. Thus, in one variation, the compressed air is turbulently released from the bottle by the balayage technique to facilitate cooling of the heated bottle. It is believed that the preforms according to the present invention can be blow molded into low-shrinkage bottles using lower-than-conventional pressure for the compressed air.

With respect to the high-clarity, hot-fill polyester bottle preforms of the present invention, after the reheating step, the preforms are blow molded into low-shrinkage bottles within a cycle time of less than about 6 seconds (i.e., at normal production rates).

Those of ordinary skill in the art will understand that any defect in the preform is typically transferred to the bottle. Accordingly, the quality of the bottle resin used to form injection-molded preforms is critical to achieving commercially acceptable bottles. Aspects of injection-molding preforms and stretch-blow molding bottles are discussed in U.S. Pat. No. 6,309,718 for Large Polyester Containers and Method for Making the Same, which is hereby incorporated entirely herein by reference.

Those of ordinary skill in the art will further appreciate that branching agents may be included in small amounts (e.g., less than about 2,000 ppm) to increase polymerization rates and improve bottle-making processes. Chain branching agents can be introduced, for example, during esterification or melt phase polymerization. Typically, less than 0.1 mole percent branching agent is included in the polyethylene terephthalate resins of the present invention.

As used herein, the term "branching agent" refers to a multifunctional monomer that promotes the formation of side branches of linked monomer molecules along the main polymer chain. See Odian, Principles of Polymerization, pp. 18–20 (Second Edition 1981). The chain branching agent is preferably selected from the group consisting of trifunctional, tetrafunctional, pentafunctional and hexafunctional alcohols or acids that will copolymerize with polyethylene terephthalate. As will be understood by those skilled in the art, a trifunctional branching agent has one reactive site available for branching, a tetrafunctional branching agent has two reactive sites available for branching, a pentafunctional branching agent has three reactive sites available for branching and a hexafunctional branching agent has four reactive sites available for branching.

Acceptable chain branching agents include, but are not limited to, trimesic acid ($C_6H_3(COOH)_3$), pyromellitic acid ($C_6H_2(COOH)_4$), pyromellitic dianhydride, trimellitic acid, trimellitic anhydride, trimethylol propane ($C_2H_5C(CH_2OH)_3$), ditrimethylol propane ($C_2H_5C(CH_2OH)_2C_2H_4OC(CH_2OH)_2C_2H_5$), dipentaerythritol ($CH_2OHC(CH_2OH)_2C_2H_4OC(CH_2OH)_2CH_2OH$), pentaerythritol ($C(CH_2OH)_4$), ethoxylated glycerol, ethoxylated pentaerythritol (3EO/4OH and 15 EO/4OH from Aldrich Chemicals), ethoxylated trimethylol propane (2.5EO/OH and 20EO/3OH from Aldrich Chemicals), and Lutrol HF-1 (an ethoxylated glycerol from BASF).

Preferred aromatic chain branching agents-aromatic rings appear to curb stress nucleation-include trimellitic acid (TMLA), trimellitic anhydride (TMA), pyromellitic acid (PMLA), pyromellitic dianhydride (PMDA), benzophenone tetracarboxylic acid, benzophenone tetracarboxylic dianhydride, naphthalene tetracarboxylic acid, and naphthalene tetracarboxylic dianhydride, as well as their derivatives:

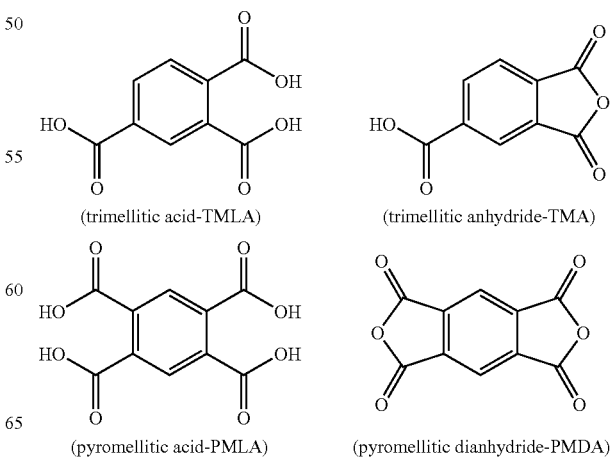

-continued

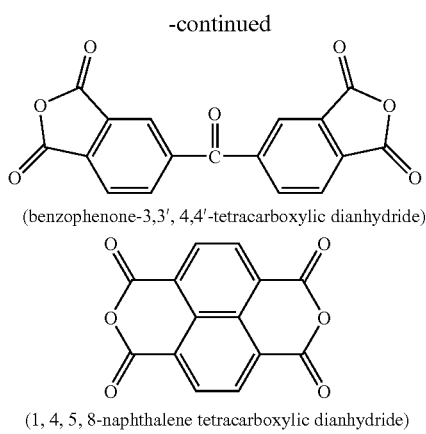

(benzophenone-3,3′, 4,4′-tetracarboxylic dianhydride)

(1, 4, 5, 8-naphthalene tetracarboxylic dianhydride)

This application incorporates entirely by reference the following commonly assigned patents, each of which discusses stoichiometric molar ratios with respect to reactive end groups (i.e., "mole-equivalent branches"): U.S. Pat. No. 6,623,853, for Polyethylene Glycol Modified Polyester Fibers and Method for Making the Same; U.S. Pat. No. 6,582,817, for Nonwoven Fabrics Formed from Polyethylene Glycol Modified Polyester Fibers and Method for Making the Same; U.S. Pat. No. 6,509,091, for Polyethylene Glycol Modified Polyester Fibers; U.S. Pat. No. 6,454,982, for Method of Preparing Polyethylene Glycol Modified Polyester Filaments; U.S. Pat. No. 6,399,705, for Method of Preparing Polyethylene Glycol Modified Polyester Filaments; U.S. Pat. No. 6,322,886, for Nonwoven Fabrics Formed from Polyethylene Glycol Modified Polyester Fibers and Method for Making the Same; U.S. Pat. No. 6,303,739, for Method of Preparing Polyethylene Glycol Modified Polyester Filaments; and U.S. Pat. No. 6,291,066, for Polyethylene Glycol Modified Polyester Fibers and Method for Making the Same.

In the specification and the figures, typical embodiments of the invention have been disclosed. Specific terms have been used only in a generic and descriptive sense, and not for purposes of limitation. The scope of the invention is set forth in the following claims.

The invention claimed is:

1. A polyethylene terephthalate preform that can be formed into a hot-fill bottle having excellent color, clarity, and shrinkage properties, comprising:
   polyethylene terephthalate polymers including between about 2 and 6 mole percent comonomer substitution; between about 2 and 20 ppm of elemental titanium; and less than 50 ppm of elemental antimony, if any;
   wherein the polyethylene terephthalate preform has a heating crystallization exotherm peak temperature ($T_{CH}$) of more than about 140° C. at a heating rate of 10° C. per minute as measured by differential scanning calorimetry;
   wherein the polyethylene terephthalate preform has an absorbance (A) of at least about 0.18 cm$^{-1}$ at a wavelength of 1100 nm or at a wavelength of 1280 nm; and
   wherein the polyethylene terephthalate preform has an L* value of more than about 70 as classified in the CIE L*a*b* color space.

2. A polyethylene terephthalate preform according to claim 1, wherein the polyethylene terephthalate polymers include between about 3 and 4 mole percent comonomer substitution.

3. A polyethylene terephthalate preform according to claim 1, wherein the polyethylene terephthalate preform is essentially free of antimony and germanium.

4. A polyethylene terephthalate preform according to claim 1, wherein the polyethylene terephthalate preform comprises less than about 50 ppm of elemental cobalt and less than about 60 ppm of elemental phosphorus.

5. A polyethylene terephthalate preform according to claim 1, further comprising a heat-up rate additive that is present in an amount sufficient to improve the preform's reheating profile; and
   wherein the polyethylene terephthalate preform has an L* value of more than about 80 and a b* color value of less than about 4 as classified by the CIE L*a*b* color space.

6. A polyethylene terephthalate preform according to claim 1, further comprising a heat-up rate additive that is present in an amount sufficient to improve the preform's reheating profile; and
   wherein the polyethylene terephthalate preform has an absorbance (A) of at least about 0.30 cm$^{-1}$ at a wavelength of 1100 nm or at a wavelength of 1280 nm.

7. A polyethylene terephthalate preform according to claim 1, further comprising a spinel that is present in an amount sufficient to improve the preform's reheating profile; and
   wherein the polyethylene terephthalate preform has an absorbance (A) of at least about 0.40 cm$^{-1}$ at a wavelength of 1100 nm or at a wavelength of 1280 nm.

8. A polyethylene terephthalate preform according to claim 1, wherein the polyethylene terephthalate preform has an intrinsic viscosity less than about 0.86 dl/g.

9. A polyethylene terephthalate preform according to claim 1, wherein:
   the polyethylene terephthalate preform has a heating crystallization exotherm peak temperature ($T_{CH}$) of between about 143° C. and 153° C. at a heating rate of 10° C. per minute as measured by differential scanning calorimetry;
   the polyethylene terephthalate preform has an absorbance (A) of at least about 0.20 cm$^{-1}$ at a wavelength of 1100 nm and at a wavelength of 1280 nm; and
   the polyethylene terephthalate preform has a crystalline melting peak temperature ($T_M$) of at least about 240° C.

10. A polyethylene terephthalate preform according to claim 1, wherein:
    the polyethylene terephthalate preform has a cooling crystallization exotherm peak temperature ($T_{CC}$) of less than 190° C. at a cooling rate of 10° C. per minute as measured by differential scanning calorimetry; and
    the polyethylene terephthalate preform has a crystalline melting peak temperature ($T_M$) of at least about 250° C.

11. A polyethylene terephthalate preform according to claim 1, wherein the polyethylene terephthalate preform has a 1100:550 absorption ratio of at least about 70 percent and a 1280:550 absorption ratio of at least about 70 percent.

12. A polyethylene terephthalate preform according to claim 1, wherein the polyethylene terephthalate preform has a 1100:700 absorption ratio of at least about 90 percent and a 1280:700 absorption ratio of at least about 90 percent.

13. A polyester bottle formed from the polyethylene terephthalate preform according to claim 1, wherein:
    the polyester bottle has sidewall haze of less than about 15 percent; and the polyester bottle, when filled at 195° F., exhibits an average circumferential dimension change of less than about 3 percent as measured from bottle shoulder to bottle base.

14. A polyester bottle formed from the polyethylene terephthalate preform according to claim 1, wherein:
the polyester bottle has sidewall haze of less than about 10 percent; and
the polyester bottle, when filled at 205° F., exhibits an average circumferential dimension change of less than about 5 percent as measured from bottle shoulder to bottle base.

15. A polyethylene terephthalate preform having an improved reheating profile, comprising:
polyethylene terephthalate polymers including less than about 6 mole percent comonomer substitution;
less than about 25 ppm of elemental antimony, if any;
more than about 5 ppm of elemental phosphorus; and
a heat-up rate additive that is present in an amount sufficient to improve the preform's reheating profile;
wherein the polyethylene terephthalate preform has an intrinsic viscosity between about 0.68 and 0.86 dl/g;
wherein the polyethylene terephthalate preform has a heating crystallization exotherm peak temperature ($T_{CH}$) of more than about 140° C. at a heating rate of 10° C. per minute as measured by differential scanning calorimetry;
wherein the polyethylene terephthalate preform has an absorbance (A) of at least about 0.25 $cm^{-1}$ at a wavelength of 1100 nm or at a wavelength of 1280 nm; and
wherein the polyethylene terephthalate preform has an L* value of more than about 75 as classified in the CIE L*a*b* color space.

16. A polyethylene terephthalate preform according to claim 15, wherein the polyethylene terephthalate polymers include between about 2 and 5 mole percent comonomer substitution.

17. A polyethylene terephthalate preform according to claim 15, wherein the polyethylene terephthalate preform comprises less than about 5 ppm of elemental germanium, if any.

18. A polyethylene terephthalate preform according to claim 15, further comprising between about 5 and 15 ppm of elemental titanium and between about 15 and 40 ppm of elemental cobalt.

19. A polyethylene terephthalate preform according to claim 18, wherein the polyethylene terephthalate preform has a 1100:550 absorption ratio of at least about 70 percent, a 1280:550 absorption ratio of at least about 70 percent, a 1100:700 absorption ratio of at least about 90 percent, and a 1280:700 absorption ratio of at least about 90 percent.

20. A polyethylene terephthalate preform according to claim 15, wherein the heat-up rate additive is a metal-containing heat-up rate additive that is present in the preform in an amount between about 10 and 300 ppm.

21. A polyethylene terephthalate preform according to claim 20, wherein the metal-containing heat-up rate additive comprises a molybdenum-based or a tungsten-containing heat-up rate additive.

22. A polyethylene terephthalate preform according to claim 15, wherein the heat-up rate additive is a carbon-based heat-up rate additive selected from the group consisting of carbon black, activated carbon, and graphite, and combinations thereof, and is present in the preform in an amount between about 0 and 25 ppm.

23. A polyethylene terephthalate preform according to claim 15, wherein the heat-up rate additive is a carbon-based heat-up rate additive that is present in the preform in an amount between about 6 and 12 ppm.

24. A polyethylene terephthalate preform according to claim 15, wherein the polyethylene terephthalate preform has a b* color value of between about −3 and 3 as classified by the CIE L*a*b* color space.

25. A polyester bottle formed from the polyethylene terephthalate preform according to claim 15, wherein:
the polyester bottle has sidewall haze of less than about 10 percent; and
the polyester bottle, when filled at 195° F., exhibits an average circumferential dimension change of less than about 3 percent as measured from bottle shoulder to bottle base.

26. A polyester bottle formed from the polyethylene terephthalate preform according to claim 15, wherein:
the polyester bottle has sidewall haze of less than about 15 percent; and
the polyester bottle, when filled at 205° F., exhibits an average circumferential dimension change of less than about 5 percent as measured from bottle shoulder to bottle base.

27. A polyethylene terephthalate preform having low comonomer modification, comprising:
polyethylene terephthalate polymers including less than about 5 mole percent comonomer substitution;
between about 2 and 50 ppm of elemental titanium;
less than about 100 ppm of elemental antimony, if any; and
a heat-up rate additive that is present in an amount sufficient to improve the preform's reheating profile;
wherein the polyethylene terephthalate preform has an intrinsic viscosity less than about 0.86 dl/g;
wherein the polyethylene terephthalate preform has a heating crystallization exotherm peak temperature ($T_{CH}$) of more than about 140° C. at a heating rate of 10° C. per minute as measured by differential scanning calorimetry;
wherein the polyethylene terephthalate preform has an absorbance (A) of at least about 0.28 $cm^{-1}$ at a wavelength of 1100 nm or at a wavelength of 1280 nm; and
wherein the polyethylene terephthalate preform has an L* value of more than about 75 as classified in the CIE L*a*b* color space.

28. A polyethylene terephthalate preform according to claim 27, wherein the polyethylene terephthalate preform comprises less than about 25 ppm of elemental antimony, if any, and more than about 5 ppm of elemental phosphorus.

29. A polyethylene terephthalate preform according to claim 27, wherein the polyethylene terephthalate preform comprises less than about 10 ppm of elemental antimony, if any, and is essentially free of germanium.

30. A polyethylene terephthalate preform according to claim 27, wherein the polyethylene terephthalate preform comprises less than about 25 ppm of elemental titanium.

31. A polyethylene terephthalate preform according to claim 27, wherein the heat-up rate additive comprises a spinel that is present in the preform in an amount between about 10 and 100 ppm.

32. A polyethylene terephthalate preform according to claim 27, wherein the heat-up rate additive comprises a spinel that is present in the preform in an amount between about 15 and 25 ppm.

33. A polyethylene terephthalate preform according to claim 27, wherein the heat-up rate additive is a carbon-based heat-up rate additive selected from the group consisting of carbon black, activated carbon, and graphite, and combinations thereof, and is present in the preform in an amount between about 4 and 16 ppm.

34. A polyethylene terephthalate preform according to claim 27, wherein:
the polyethylene terephthalate preform comprises less than about 40 ppm of elemental cobalt; and
the polyethylene terephthalate preform has a b* color value of less than about 4 as classified by the CIE L*a*b* color space.

35. A polyethylene terephthalate preform according to claim 27, wherein:
the polyethylene terephthalate preform has a heating crystallization exotherm peak temperature ($T_{CH}$) of more than about 143° C. at a heating rate of 10° C. per minute as measured by differential scanning calorimetry; and
the polyethylene terephthalate preform has a crystalline melting peak temperature ($T_M$) of at least about 250° C.

36. A polyethylene terephthalate preform according to claim 27, wherein the polyethylene terephthalate preform has a 1100:550 absorption ratio of at least about 75 percent and a 1280:550 absorption ratio of at least about 75 percent.

37. A polyester bottle formed from the polyethylene terephthalate preform according to claim 27, wherein:
the polyester bottle has sidewall haze of less than about 15 percent; and
the polyester bottle, when filled at 195° F., exhibits an average circumferential dimension change of less than about 3 percent as measured from bottle shoulder to bottle base.

38. A polyester bottle formed from the polyethylene terephthalate preform according to claim 27, wherein:
the polyester bottle has sidewall haze of less than about 15 percent; and
the polyester bottle, when filled at 195° F., exhibits a maximum circumferential dimension change of less than about 4 percent as measured from bottle shoulder to bottle base.

39. A polyester bottle formed from the polyethylene terephthalate preform according to claim 27, wherein:
the polyester bottle has sidewall haze of less than about 10 percent; and
the polyester bottle, when filled at 205° F., exhibits an average circumferential dimension change of less than about 5 percent as measured from bottle shoulder to bottle base.

40. A polyethylene terephthalate preform, comprising:
polyethylene terephthalate polymers including less than about 6 mole percent comonomer substitution;
between about 5 and 15 ppm of elemental titanium;
between about 15 and 40 ppm of elemental cobalt;
less than about 25 ppm of elemental antimony, if any;
less than about 5 ppm of elemental germanium, if any; and
a heat-up rate additive that is present in an amount sufficient to improve the preform's reheating profile;
wherein the polyethylene terephthalate preform has an absorbance (A) of at least about 0.20 cm$^{-1}$ at a wavelength of 1100 nm and at a wavelength of 1280 nm;
wherein the polyethylene terephthalate preform has a 1100:550 absorption ratio of at least about 70 percent, a 1280:550 absorption ratio of at least about 70 percent, a 1100:700 absorption ratio of at least about 85 percent, and a 1280:700 absorption ratio of at least about 85 percent;
wherein the polyethylene terephthalate preform has an L* value of more than about 70 as classified in the CIE L*a*b* color space; and
wherein the polyethylene terephthalate preform has a b* color value of less than about 4 as classified by the CIE L*a*b* color space.

41. A polyethylene terephthalate preform according to claim 40, wherein the polyethylene terephthalate preform comprises less than about 10 ppm of elemental antimony, if any.

42. A polyethylene terephthalate preform according to claim 40, wherein the heat-up rate additive is a metal-containing heat-up rate additive that is present in the preform in an amount between about 10 and 300 ppm.

43. A polyethylene terephthalate preform according to claim 40, wherein the heat-up rate additive is a carbon-based heat-up rate additive that is present in the preform in an amount in an amount greater than 0 ppm and less than about 25 ppm.

44. A polyethylene terephthalate preform according to claim 40, wherein:
the polyethylene terephthalate polymers include between about 3 and 4 mole percent comonomer substitution; and
the polyethylene terephthalate preform has an intrinsic viscosity between about 0.72 and 0.84 dl/g.

45. A polyethylene terephthalate preform according to claim 40, wherein:
the polyethylene terephthalate preform has an L* value of more than about 80 as classified in the CIE L*a*b* color space; and
the polyethylene terephthalate preform has an intrinsic viscosity of less than about 0.86 dug.

46. A polyethylene terephthalate preform according to claim 40, wherein the polyethylene terephthalate preform has an absorbance (A) of at least about 0.24 cm$^{-1}$ at a wavelength of 1100 nm and at a wavelength of 1280 nm.

47. A polyethylene terephthalate preform according to claim 40, wherein:
the polyethylene terephthalate preform has a heating crystallization exotherm peak temperature ($T_{CH}$) of more than about 140° C. at a heating rate of 10° C. per minute as measured by differential scanning calorimetry; and
the polyethylene terephthalate preform has a cooling crystallization exotherm peak temperature ($T_{CC}$) of less than 190° C. at a cooling rate of 10° C. per minute as measured by differential scanning calorimetry.

48. A polyester bottle formed from the polyethylene terephthalate preform according to claim 40, wherein:
the polyester bottle has sidewall haze of less than about 15 percent; and
the polyester bottle, when filled at 195° F., exhibits a maximum circumferential dimension change of less than about 4 percent as measured from bottle shoulder to bottle base.

49. A polyester bottle formed from the polyethylene terephthalate preform according to claim 40, wherein:
the polyester bottle has sidewall haze of less than about 10 percent; and
the polyester bottle, when filled at 195° F., exhibits a maximum circumferential dimension change of less than about 5 percent as measured from bottle shoulder to bottle base.

50. A polyethylene terephthalate preform having excellent color, comprising:

polyethylene terephthalate polymers including between about 2 and 5 mole percent comonomer substitution;
between about 2 and 20 ppm of elemental titanium;
between about 10 and 50 ppm of elemental cobalt;
more than about 5 ppm of elemental phosphorus;
less than about 25 ppm of elemental antimony, if any;
less than about 5 ppm of elemental germanium, if any; and
a heat-up rate additive that is present in an amount sufficient to improve the preform's reheating profile;
wherein the polyethylene terephthalate preform has an intrinsic viscosity between about 0.72 and 0.84 dl/g;
wherein the polyethylene terephthalate preform has an L* value of more than about 80 as classified in the CIE L*a*b* color space; and
wherein the polyethylene terephthalate preform has a b* color value of between about −3 and 3 as classified by the CIE L*a*b* color space.

51. A polyethylene terephthalate preform according to claim 50, wherein the polyethylene terephthalate preform is essentially free of antimony.

52. A polyethylene terephthalate preform according to claim 50, wherein the preform comprises between about 5 and 15 ppm of elemental titanium, between about 15 and 40 ppm of elemental cobalt, and less than about 60 ppm of elemental phosphorus.

53. A polyethylene terephthalate preform according to claim 50, wherein the heat-up rate additive is a metal-containing heat-up rate additive that is present in the preform in an amount between about 150 and 250 ppm.

54. A polyethylene terephthalate preform according to claim 50, wherein the heat-up rate additive comprises a spinel that is present in the preform in an amount between about 10 and 25 ppm.

55. A polyethylene terephthalate preform according to claim 50, wherein the heat-up rate additive is a carbon-based heat-up rate additive that is present in the preform in an amount in an amount between about 4 and 16 ppm.

56. A polyethylene terephthalate preform according to claim 50, wherein:
the polyethylene terephthalate preform has a heating crystallization exotherm peak temperature ($T_{CH}$) of more than about 142° C. at a heating rate of 10° C. per minute as measured by differential scanning calorimetry; and
the polyethylene terephthalate preform has an absorbance (A) of at least about 0.24 cm$^{-1}$ at a wavelength of 1100 nm and at a wavelength of 1280 nm.

57. A polyethylene terephthalate preform according to claim 50, wherein:
the polyethylene terephthalate preform has a heating crystallization exotherm peak temperature ($T_{CH}$) of more than about 140° C. at a heating rate of 10° C. per minute as measured by differential scanning calorimetry;
the polyethylene terephthalate preform has a cooling crystallization exotherm peak temperature ($T_{CC}$) of less than 185° C. at a cooling rate of 10° C. per minute as measured by differential scanning calorimetry; and
the polyethylene terephthalate preform has a crystalline melting peak temperature ($T_M$) of at least about 245° C.

58. A polyethylene terephthalate preform according to claim 50, wherein the polyethylene terephthalate preform has an absorbance (A) of at least about 0.28 cm$^{-1}$ at a wavelength of 1100 nm and at a wavelength of 1280 nm.

59. A polyester bottle formed from the polyethylene terephthalate preform according to claim 50, wherein:
the polyester bottle has sidewall haze of less than about 10 percent; and
the polyester bottle, when filled at 195° F., exhibits an average circumferential dimension change of less than about 3 percent as measured from bottle shoulder to bottle base.

60. A polyester bottle formed from the polyethylene terephthalate preform according to claim 50, wherein:
the polyester bottle has sidewall haze of less than about 10 percent; and
the polyester bottle, when filled at 195° F., exhibits a maximum circumferential dimension change of less than about 5 percent as measured from bottle shoulder to bottle base.

61. A polyester bottle formed from the polyethylene terephthalate preform according to claim 50, wherein:
the polyester bottle has sidewall haze of less than about 15 percent; and
the polyester bottle, when filled at 205° F., exhibits an average circumferential dimension change of less than about 5 percent as measured from bottle shoulder to bottle base.

62. A polyethylene terephthalate preform according to claim 1, wherein the polyethylene terephthalate preform comprises less than about 25 ppm of elemental antimony, if any, and more than about 5 ppm of elemental phosphorus.

63. A polyethylene terephthalate preform according to claim 1, further comprising branching agent that is present in an amount greater than 0 and less than 0.1 mole percent.

64. A polyethylene terephthalate preform according to claim 15, further comprising branching agent that is present in the preform in an amount greater than 0 and less than 0.1 mole percent.

65. A polyethylene terephthalate preform according to claim 27, wherein the polyethylene terephthalate preform comprises less than about 10 ppm of elemental antimony, if any, and more than about 2 ppm of elemental phosphorus.

66. A polyethylene terephthalate preform according to claim 27, further comprising branching agent that is present in the preform in an amount greater than 0 and less than 0.1 mole percent.

67. A polyethylene terephthalate preform according to claim 40, further comprising more than about 5 ppm of elemental phosphorus.

68. A polyethylene terephthalate preform according to claim 50, further comprising branching agent that is present in the preform in an amount greater than 0 and less than 0.1 mole percent.

* * * * *

UNITED STATES PATENT AND TRADEMARK OFFICE
CERTIFICATE OF CORRECTION

PATENT NO. : 7,094,863 B2  Page 1 of 1
APPLICATION NO. : 10/996789
DATED : August 22, 2006
INVENTOR(S) : Tony Clifford Moore et al.

It is certified that error appears in the above-identified patent and that said Letters Patent is hereby corrected as shown below:

In the Title Page:
Item (73) reads "Wellman, Inc. Fort Hill, SC (US)" and should read -- Wellman, Inc. Fort Mill, SC (US) --

Item (74) reads "Summa, Allan & Addition, P.A." and should read -- Summa, Allan & Additon, P.A. --

Column 14, line 60 reads "where prepared from an antimony-catalyzed polyethylene" and should read -- were prepared from an antimony-catalyzed polyethylene --

Claim 43 at column 32, line 18, please omit a repetitive "in the amount" so that the line reads -- amount greater than 0 ppm and less than about --

Claim 45 at column 32, line 33 reads "viscosity of less than about 0.86 dug." and should read -- viscosity of less than about 0.86 dl/g. --

Claim 55 at column 33, line 38, please omit a repetitive "in the amount" so that the line reads -- amount between about 4 and 16 ppm. --

Signed and Sealed this

Thirteenth Day of February, 2007

JON W. DUDAS
*Director of the United States Patent and Trademark Office*